(12) United States Patent
Shibata et al.

(10) Patent No.: US 9,436,981 B2
(45) Date of Patent: Sep. 6, 2016

(54) DICTIONARY CREATION DEVICE, IMAGE PROCESSING DEVICE, IMAGE PROCESSING SYSTEM, DICTIONARY CREATION METHOD, IMAGE PROCESSING METHOD, AND PROGRAM

(71) Applicants: Takashi Shibata, Tokyo (JP); Akihiko Iketani, Tokyo (JP); Shuji Senda, Tokyo (JP)

(72) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 14/363,367

(22) PCT Filed: Dec. 10, 2012

(86) PCT No.: PCT/JP2012/082595
§ 371 (c)(1),
(2) Date: Jun. 6, 2014

(87) PCT Pub. No.: WO2013/089265
PCT Pub. Date: Jun. 20, 2013

(65) Prior Publication Data
US 2014/0321738 A1 Oct. 30, 2014

(30) Foreign Application Priority Data

Dec. 12, 2011 (JP) ................. 2011-271531

(51) Int. Cl.
*G06K 9/00* (2006.01)
*G06T 5/00* (2006.01)
*G06N 99/00* (2010.01)

(52) U.S. Cl.
CPC ........... *G06T 5/003* (2013.01); *G06K 9/00275* (2013.01); *G06N 99/005* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 6,766,067 B2 * | 7/2004 | Freeman | ............... G06T 3/4053 348/441 |
| 7,715,658 B2 * | 5/2010 | Cho | ....................... G06T 3/4084 382/226 |

(Continued)

FOREIGN PATENT DOCUMENTS

| JP | 2007-293912 A | 11/2007 |
| JP | 2008-234479 A | 10/2008 |

(Continued)

OTHER PUBLICATIONS

English Translation Written Opinion of International Search Report PCT/JP2012/082595, Jun. 12, 2014, pp. 1-3.*

(Continued)

*Primary Examiner* — Daniel Mariam
(74) *Attorney, Agent, or Firm* — Wilmer Cutler Pickering Hale and Dorr LLP

(57) ABSTRACT

A dictionary creation device including a blurred image generation unit which outputs a blurred image generated by performing a blurring process to a learning image together with a blur parameter indicating a blurring state of the blurred image, a patch pair generation unit which generates a restoration patch and a blurred patch as a patch pair that is composed of the patches located at the corresponding positions of the learning image and the blurred image, and a registration unit which associates the patch pair with a blur parameter corresponding to the blurred patch in the patch pair and registers them in a dictionary.

15 Claims, 18 Drawing Sheets

(56) References Cited

U.S. PATENT DOCUMENTS

| | | | |
|---|---|---|---|
| 8,526,765 B2* | 9/2013 | Sakaguchi | G06T 3/4053 348/538 |
| 8,917,948 B2* | 12/2014 | Jin | G06T 3/4053 382/254 |
| 2006/0115176 A1 | 6/2006 | Kanamori et al. | |
| 2011/0188770 A1* | 8/2011 | Weinberger | G06K 9/40 382/255 |
| 2012/0045095 A1* | 2/2012 | Tate | G06T 5/003 382/103 |

FOREIGN PATENT DOCUMENTS

| | | |
|---|---|---|
| JP | 2008-243093 A | 10/2008 |
| JP | 4494505 B1 | 4/2010 |
| JP | 4645746 B2 | 12/2010 |
| JP | 2011-070283 A | 4/2011 |
| JP | 2011-129114 A | 6/2011 |
| WO | WO-2005-122089 A1 | 12/2005 |

OTHER PUBLICATIONS

International Search Report corresponding to PCT/JP2012/082595 dated Mar. 19, 2013 (3 pages).

Yasunori Taguchi, et al., "A Learning Method of Representative Examples for Image Super-Resolution by Closed-Loop Training," The Journal of The Institute of Electronics, Information and Communication Engineer D, Information System, vol. J92-D No. 6, Jun. 1, 2009, pp. 831-842.

* cited by examiner

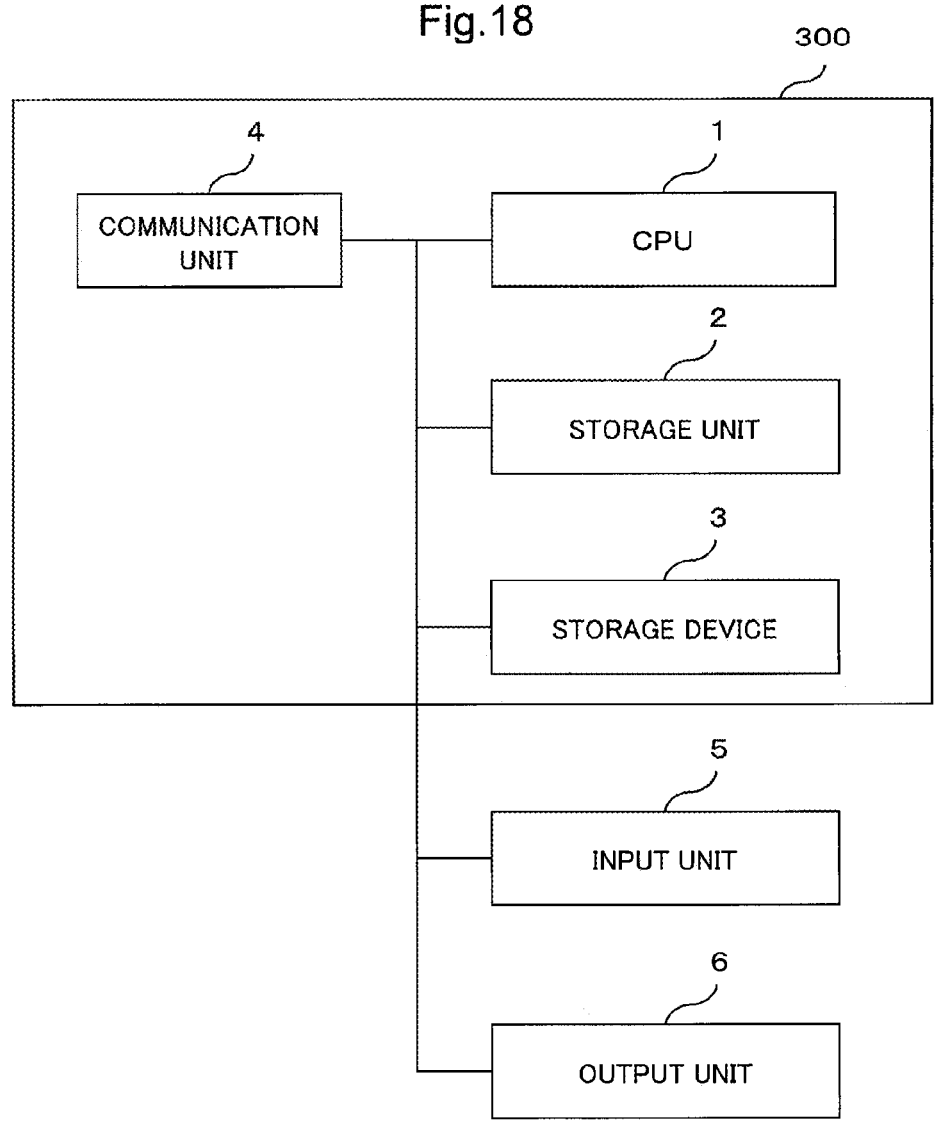

US 9,436,981 B2

DICTIONARY CREATION DEVICE, IMAGE PROCESSING DEVICE, IMAGE PROCESSING SYSTEM, DICTIONARY CREATION METHOD, IMAGE PROCESSING METHOD, AND PROGRAM

CROSS-REFERENCE TO RELATED APPLICATIONS

This application is a national stage application of International Application No. PCT/JP2012/082595 entitled "Dictionary Creation Device, Image Processing Device, Image Processing System, Dictionary Creation Method, Image Processing Method, and Program," filed on Dec. 10, 2012, which claims the benefit of the priority of Japanese Patent Application No. 2011-271531, filed on Dec. 12, 2011, the disclosures of each of which are hereby incorporated by reference in their entirety.

TECHNICAL FIELD

The present invention relates to a dictionary creation device which creates a restored image from a blurred image, an image processing device, an image processing system, a dictionary creation method, an image processing method, and a program.

BACKGROUND ART

A super resolution technology is known as an example of a technology to generate the restored image from the blurred image. When a learning based super resolution technology in the super resolution technology is used, a case example in which a low resolution image is associated with a high resolution image is learned and a result of the learning is used as a dictionary. One example of the learning based super resolution technology is described in non-patent document 1.

In the learning based super resolution technology described in non-patent document 1, the following process (hereinafter, referred to as a super-resolution process) is performed. First, the super-resolution process receives an input image that is a low resolution image.

Next, the super-resolution process generates a temporary high resolution image by increasing the number of pixels of the input image by using an interpolation method.

Further, the super-resolution process generates a low frequency component by subtracting the image obtained by increasing the number of pixels of the input image by using a nearest neighbor interpolation method from the temporary high resolution image.

The super-resolution process cuts out a low frequency patch from the generated low frequency component and calculates a low frequency feature quantity from the low frequency patch.

Next, the super-resolution process searches for some low frequency feature quantity learning data in a dictionary in order of increasing distance from the calculated low frequency feature quantity and reads a high frequency feature quantity paired with these data.

The super-resolution process selects one high frequency feature quantity on the basis of a distance at the time of the search, a consistency with an adjacent high frequency block, a co-occurrence probability of the low frequency feature quantity and the high frequency feature quantity separately learned at a learning stage, or the like.

The technology described in non-patent document 1 uses a dictionary structure with one-to-many relation in which the low frequency feature quantities that are mutually similar to each other are aggregated to one representative and whereby a memory amount is suppressed and a calculation cost is reduced.

An example of the learning technology to create the dictionary is described in patent document 1.

The technology described in patent document 1 includes the following functional means.

Specifically, it includes image input means which inputs an image, face detection means which detects a person's face image from the inputted image, first data collection means which collects a plurality of face data obtained from a plurality of face images in a plurality of images that are inputted and obtained by photographing the faces of a registrant taking various postures, second data collection means which collects a plurality of face data obtained from the plurality of the face images in the plurality of images that are inputted and obtained by photographing the face of the registrant during walking, integration means which integrates the face data collected by the first data collection means and the face data collected by the second data collection means, and storage means which stores the integrated data as dictionary data of the registrant.

In the technology described in patent document 1, the above-mentioned configuration is used. Therefore, a load on a user can be reduced and dictionary data can be efficiently registered.

Further, another related image processing technology is described in patent document 2.

CITATION LIST

Patent Document

[Patent document 1] Japanese Patent Application Laid-Open No. 2008-243093
[Patent document 2] Japanese Patent Application Laid-Open No. 2011-070283

Non-Patent Document

[Non-patent document 1] Yasunori Taguchi, Toshiyuki Ono, Takeshi Mita, Takashi Ida, "A Learning Method of Representative Examples for Image Super-Resolution by Closed-Loop Training", The journal of the Institute of Electronics, Information and Communication Engineer D, Information System, Vol. J92-D No. 6, pp. 831-842, Jun. 1, 2009

SUMMARY OF THE INVENTION

However, the technologies described in non-patent document 1 and patent documents 1 and 2 have a problem in which the high resolution image cannot be necessarily obtained with high accuracy.

This is because with respect to a blur of the image, there are two types of blurs, one is easily estimated and the other is not easily estimated and with respect to a patch in which a blur that cannot be easily estimated is generated, a high resolution patch is erroneously selected.

Therefore, an object of the present invention is to provide a dictionary creation device which can flexibly select the restored patch according to the type of blur, an image processing device, an image processing system, a dictionary creation method, an image processing method, and a program.

In order to achieve the above object, a dictionary creation device including: a blurred image generation means for outputting a blurred image generated by performing a blurring process to a learning image that is an image before the blurring process together with a blur parameter indicating a blurring state of the blurred image; a patch pair generation means for generating a restoration patch that is a patch of the learning image and a blurred patch that is a patch of the blurred image as a patch pair that is composed of the patches located at the corresponding positions of the learning image and the blurred image; and a registration means for associating the patch pair with a blur parameter corresponding to the blurred patch in the patch pair and registers them in a dictionary.

In order to achieve the above object, an image processing device comprising: a blur estimation means for estimating a value of a blur parameter indicating a blurring state with respect to an input image that is an image received from outside; a patch generation means for dividing the input image and generating a plurality of input patches; a selection means for referring to a dictionary storing two or more sets of data in which a blurred patch that is a patch of a blurred image generated from a learning image that is an image before a blurring process, a restoration patch that is a patch of the learning image, and the blur parameter of the blurred patch are associated with each other and for selecting the restoration patch for each input patch based on a value indicating a feature similarity and a value indicating a similarity of the blur parameter between the input patch and the blurred patch in the dictionary; and a combining means for combining the restoration patches selected for each input patch and generating the restored image.

In order to achieve the above object, an image processing device comprising: a blur estimation means for estimating a value of a blur parameter indicating a blurring state with respect to an input image that is an image received from outside; a patch generation means for dividing the input image and generating a plurality of input patches; a selection means for referring to a dictionary storing two or more sets of data in which a blurred patch that is a patch of a blurred image generated from a learning image that is an image before a blurring process, a restoration patch that is a patch of the learning image, and the blur parameter of the blurred patch are associated with each other and selects the restoration patch for each input patch based on a value indicating a feature similarity and a value indicating a similarity of the blur parameter between the input patch and the blurred patch in the dictionary; and a combining means for combining the restoration patches selected for each input patch and generating the restored image.

In order to achieve the above object, a method for creating a dictionary comprising: outputting a blurred image generated by performing a blurring process to a learning image that is an image before the blurring process together with a blur parameter indicating a blurring state of the blurred image; generating a restoration patch that is a patch of the learning image and a blurred patch that is a patch of the blurred image as a patch pair that is composed of the patches located at the corresponding positions of the learning image and the blurred image; and associating the patch pair with the blur parameter corresponding to the blurred patch in the patch pair and registering them in a dictionary.

In order to achieve the above object, a method for processing an image comprising: estimating a value of a blur parameter indicating a blurring state with respect to an input image that is an image received from outside; dividing the input image and generating a plurality of input patches; referring to a dictionary storing two or more sets of data in which a blurred patch that is a patch of a blurred image generated from a learning image that is an image before a blurring process, a restoration patch that is a patch of the learning image, and the blur parameter of the blurred patch are associated with each other and selecting the restoration patch for each input patch based on a value indicating a feature similarity and a value indicating a similarity of the blur parameter between the input patch and the blurred patch in the dictionary; and combining the restoration patches selected for each input patch and generating a restored image.

In order to achieve the above object, a program which causes a computer to execute the processes of: outputting a blurred image generated by performing a blurring process to a learning image that is an image before the blurring process together with a blur parameter indicating a blurring state of the blurred image; generating a restoration patch that is a patch of the learning image and a blurred patch that is a patch of the blurred image as a patch pair that is composed of the patches located at the corresponding positions of the learning image and the blurred image; and associating the patch pair with the blur parameter corresponding to the blurred patch in the patch pair and registering them in a dictionary.

In order to achieve the above object, a program which causes a computer to execute the processes of: estimating a value of a blur parameter indicating a blurring state with respect to an input image that is an image received from outside; dividing the input image and generating a plurality of input patches; referring to a dictionary storing two or more sets of data in which a blurred patch that is a patch of a blurred image generated from a learning image that is an image before a blurring process, a restoration patch that is a patch of the learning image, and the blur parameter of the blurred patch are associated with each other and selecting the restoration patch for each input patch based on a value indicating a feature similarity and a value indicating a similarity of the blur parameter between the input patch and the blurred patch in the dictionary; and combining the restoration patches selected for each input patch and generating the restored image.

The present invention has effects in which the restored patch can be flexibly selected according to the type of blur.

BRIEF DESCRIPTION OF THE DRAWINGS

FIG. 18 is a block diagram showing a hardware configuration of a computer device which realizes the image processing device according to any one of the first exemplary embodiment to the fourth exemplary embodiment.

DESCRIPTION OF EMBODIMENTS

Figure 1:
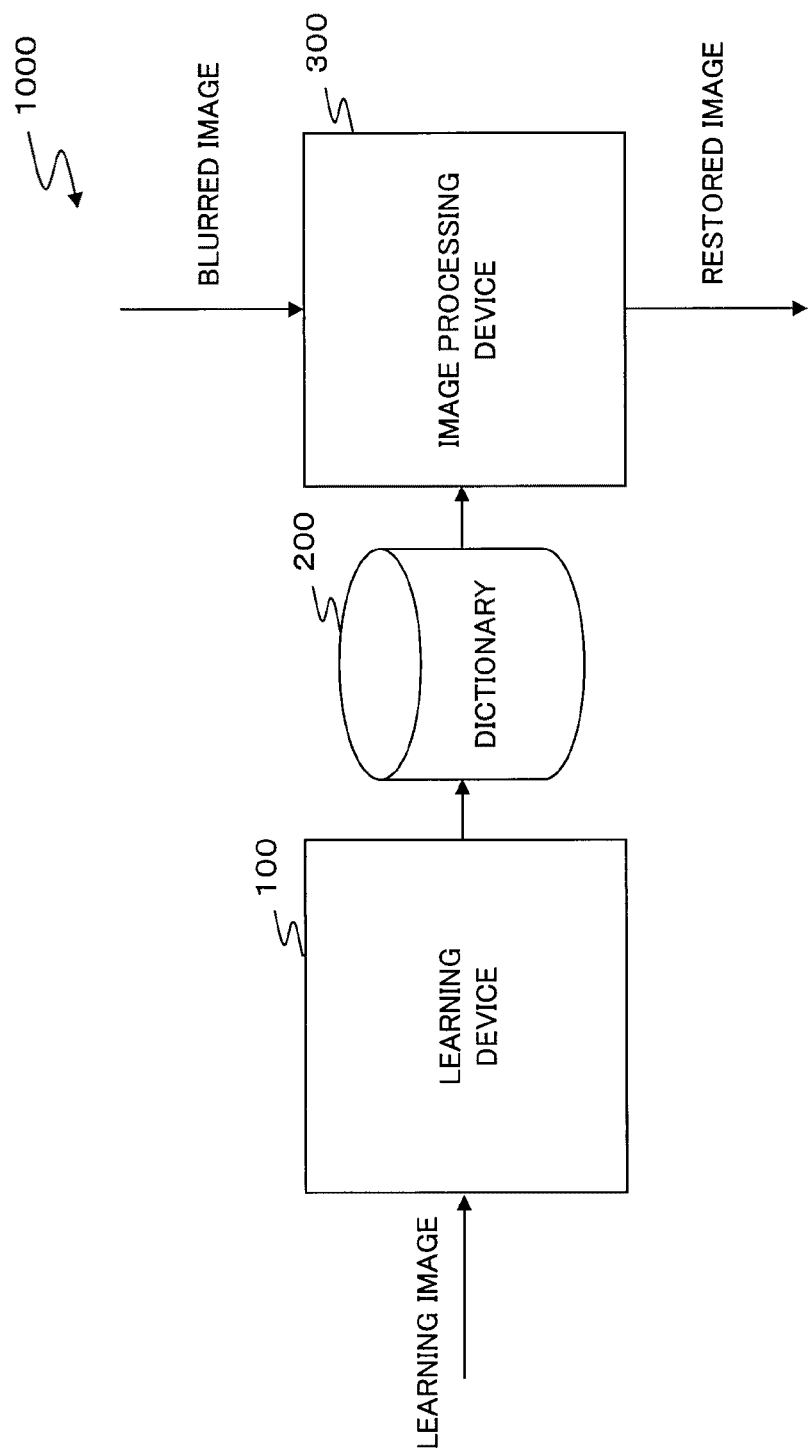
FIG. 1 is a block diagram showing a configuration of an image processing system according to a first exemplary embodiment.

Next, a Description of Embodiments of the present invention will be described in detail with reference to the drawing.

First, for ease of understanding of the exemplary embodiment of the present invention, the background of the present invention will be described. Further, in the following explanation, although the super-resolution technology is taken as an example, the present invention is not limited to the only super-resolution technology. The present invention can be applied to all technologies for generating a restored image from an input image with a poor quality for example, a noise removal technology, an image correction technology, a time resolution interpolating technology, a blur removal technology, and the like The learning based super resolution technology includes a learning phase and a restoration phase. The learning phase is a phase in which a plurality of cases are learned and a dictionary which includes patch pairs in each case as dictionary data is created.

The restoration phase is a phase in which the most suitable patch corresponding to the patch of the input image (hereinafter, referred to as an input patch) that is an object of the image processing is searched for in the dictionary created in the learning phase and the super-resolution image (the restored image) is generated by a combining process. Here, a general input image is an image with a poor quality because the resolution is low, noise is included, the image is partially destroyed, or the image is partially lost.

Here, the patch pair is a pair composed of a patch of the high resolution image and a patch of the low resolution image in a predetermined case. The high resolution image (hereinafter, referred to as a learning image) is an image with high resolution corresponding to the case. The low resolution image (hereinafter, referred to as a blurred image) is an image obtained by blurring the high resolution image. Hereinafter, the patch of the learning image (the high resolution image) is called a restoration patch and the patch of the blurred image (the low resolution image) is referred to as a blurred patch. Further, the patch is a small region image that is a partial image of an object image. For example, the patch is generated by dividing the object image into blocks.

First Exemplary Embodiment

FIG. 1 is a block diagram showing a configuration of an image processing system 1000 according to a first exemplary embodiment.

As shown in FIG. 1, the image processing system 1000 according to the first exemplary embodiment includes a learning device (that is also called a dictionary creation device) 100, a dictionary 200, and an image processing device 300. The learning device 100 receives a learning image and performs a learning phase. The dictionary 200 stores a patch pair created in the learning phase. The image processing device 300 receives an input image, performs a restoration phase by using the dictionary 200, and outputs a restored image.

Hereinafter, the learning phase and the restoration phase in the first exemplary embodiment will be described.

(Learning Phase)

The learning phase in the first exemplary embodiment of the present invention will be described with reference to FIGS. 2 to 6.

Figure 2:
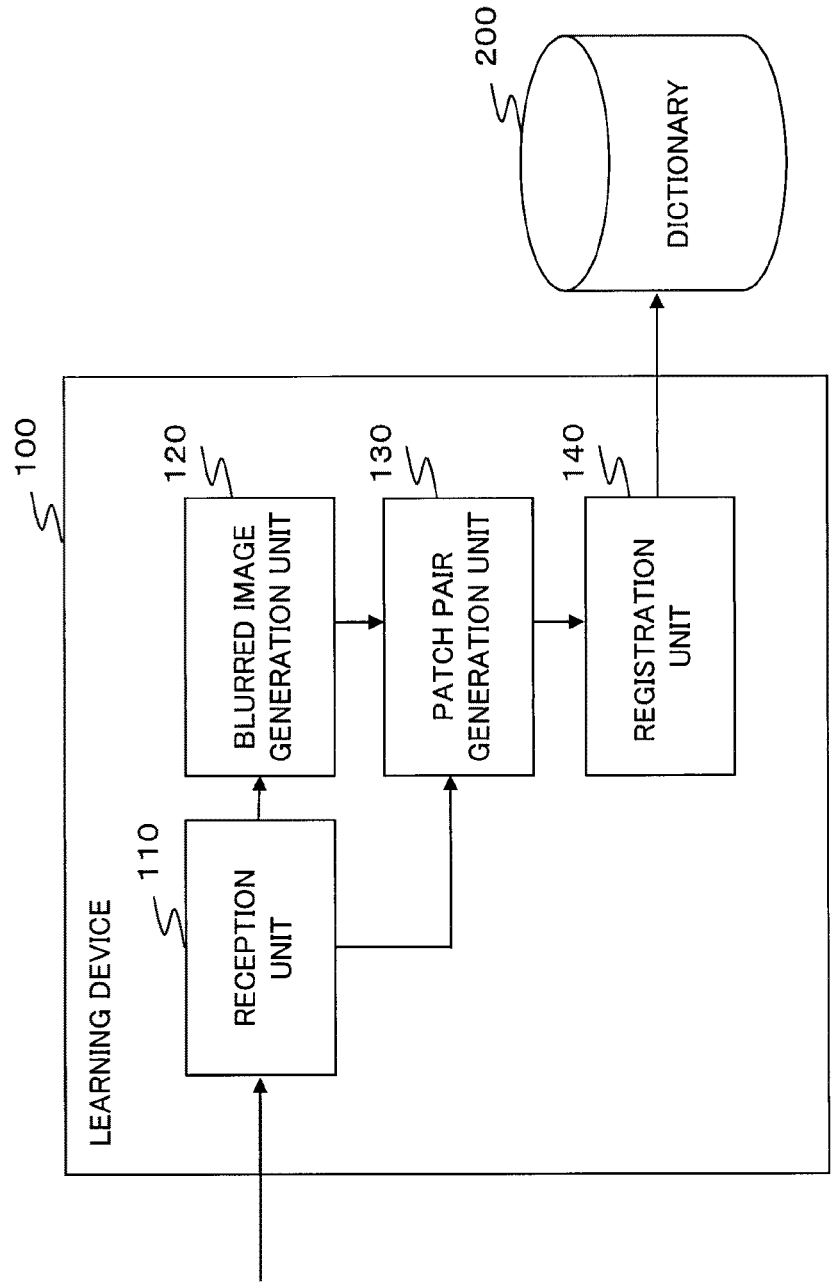
FIG. 2 is a block diagram showing a configuration of a learning device according to the first exemplary embodiment.

FIG. 2 is a block diagram showing a configuration of the learning device 100. As shown in FIG. 2, the learning device 100 includes a reception unit 110, a blurred image generation unit 120, a patch pair generation unit 130, and a registration unit 140. The learning device 100 performs the learning phase and creates the dictionary 200.

The reception unit 110 receives the learning image from outside. The reception unit 110 outputs the learning image received from outside to the blurred image generation unit 120 and the patch pair generation unit 130.

The blurred image generation unit 120 performs a blurring process to the learning image outputted from the reception unit 110 and generates a blurred image.

The blurred image generation unit 120 may perform a plurality of blurring processes to the learning image outputted from the reception unit 110 and generate a plurality of blurred images. The blurred image generation unit 120 may perform a plurality of different blurring processes to the learning image and generate a plurality of blurred images.

The blurred image generation unit 120 may generate the blurred image by performing at least one among a size reduction process, a lightness reducing process, a high frequency component eliminating process, and a posture variation process to the learning image outputted from the reception unit 110.

The blurred image generation unit 120 may generate the blurred image by reducing the learning image received from the reception unit 110 to for example, one N-th of its size. For example, a nearest neighbor method by which relatively large image quality degradation occurs may be used as an algorithm for reducing the size of the image. Further, for example, a bilinear method or a bicubic method may be used as the algorithm for reducing the size of the image.

For example, the blurred image generation unit 120 may increase a degree of blur by eliminating the high frequency component of the learning image or performing another process and generate the blurred image. In this case, the blurred image generation unit 120 may prepare a plurality of types of degrees of blur and generate the blurred image for each type of the degrees of blur. The blurred image generation unit 120 may vary the posture by tilting the learning image and generate the blurred image for each posture. Alternatively, the blurred image generation unit 120 may decrease the lightness by decreasing the brightness value of the learning image and generate the blurred image. The blurred image generation unit 120 may generate the blurred image by using various existing methods.

The blurred image generation unit 120 outputs the generated blurred image to the patch pair generation unit 130 together with a parameter (hereinafter, referred to as a "blur parameter") indicating a blurring state of the image with respect to the blurred image. Here, the blur parameter may be a parameter represented by a numerical value indicating at least one of a scaling factor of the image, the lightness, the degree of blur, and a posture slope, for each region of the image. Further, the type of the blur parameter is not limited to these types of parameters. For example, meta information of the learning image may be used as the blur parameter. For example, when the learning image is a face image, the meta information is an ID of a face that is an object, a position of a face in the learning image, or the like. Further, when the learning image is a character image or the like, the meta information is a type of character, a font, or the like. The parameter which is a numerical value indicating these meta information may be outputted together with the blurred image.

The patch pair generation unit 130 receives the learning image from the reception unit 110 and receives the blurred image of the learning image and the blur parameter of the blurred image from the blurred image generation unit 120. The patch pair generation unit 130 generates a plurality of the patch pairs, each of which is composed of the patches located at the corresponding positions of the learning image and the blurred image.

The patch pair generation unit 130 may generate a plurality of pairs ("patch pairs"), each of which is composed of the restoration patch and the blurred patch by using an existing method.

The patch pair generation unit 130 outputs a plurality of the generated patch pairs to the registration unit 140 together with the corresponding blur parameter.

The patch pair generation unit 130 may generate the patch pair by performing a so-called sub-pixel shift process. Here, a sub-pixel shift is a technology to generate a sub-pixel shifted blurred patch by shifting a small region in the learning image that is a high resolution image by one pixel column.

Here, the sub-pixel shift will be described with reference to FIG. 3 and FIG. 4.

Figure 3:
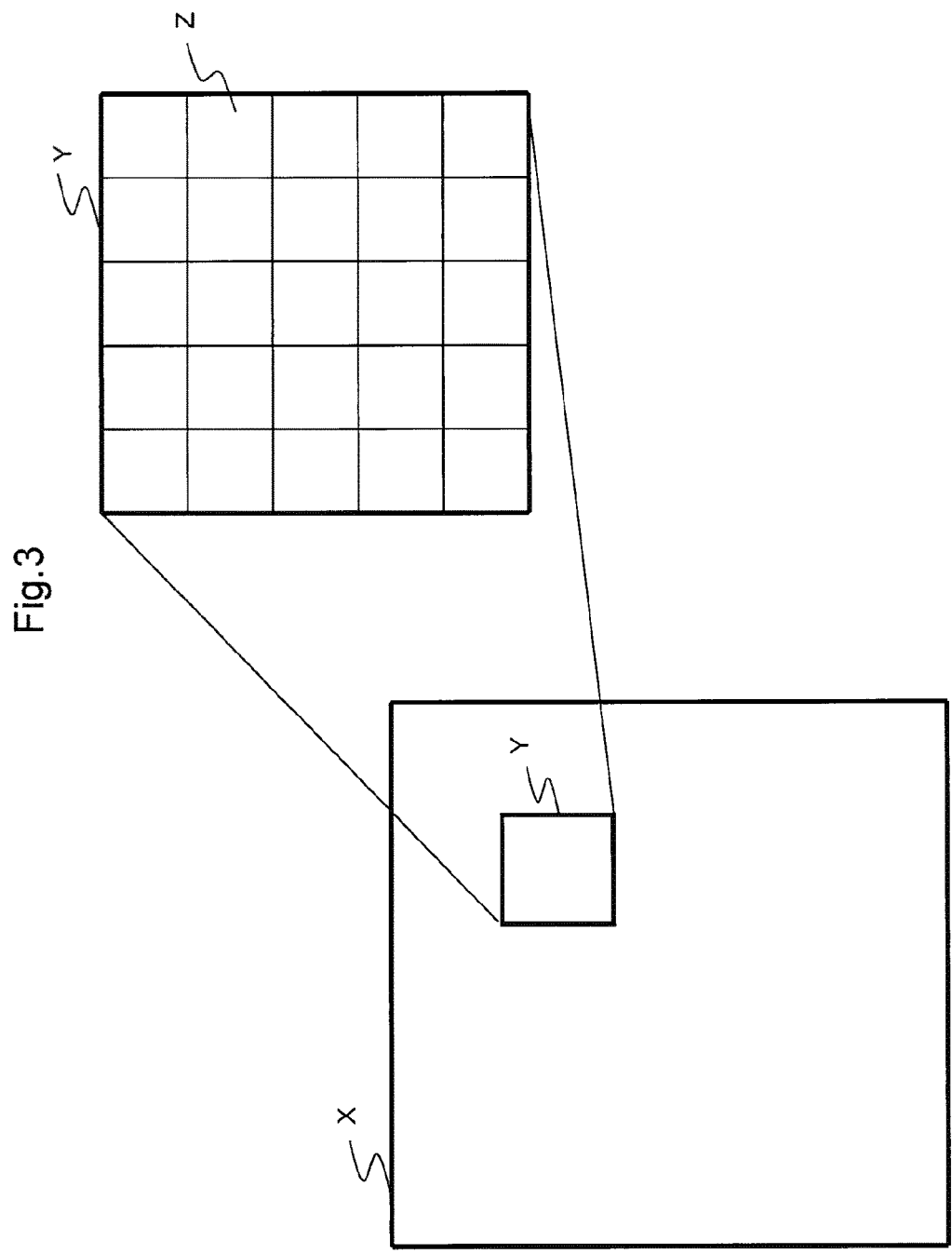
FIG. 3 is a figure for explaining a relation between an image X and a patch Y in the first exemplary embodiment.

FIG. 3 is a figure for explaining a relation between an image X and a patch Y. As shown in FIG. 3, the patch Y is a small region of one certain image X. As shown in FIG. 3, for example, the patch Y is composed of 25 pixels Z with five columns and five rows. Here, the patch Y is for example, the restoration patch.

Figure 4:
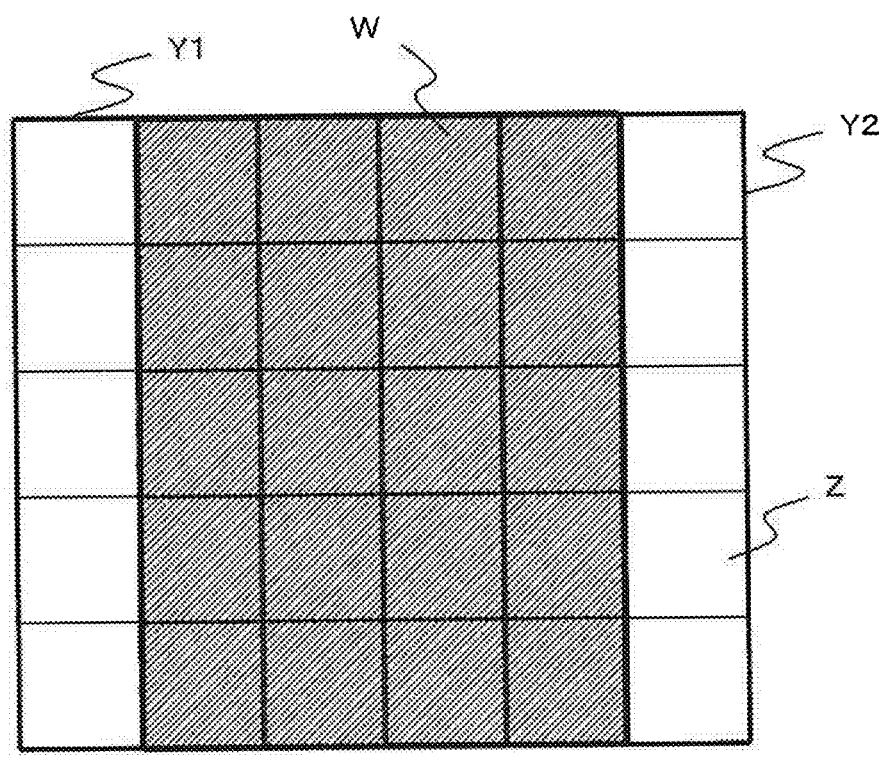
FIG. 4 is a figure for explaining one pixel column shift of a restoration patch in the first exemplary embodiment.

FIG. 4 is a figure for explaining one pixel shift in the restoration patch. As shown in FIG. 4, a position of a restoration patch Y2 adjacent to a restoration patch Y1 is shifted by one pixel column from a position of the restoration patch Y1. In other words, the restoration patch Y1 and the restoration patch Y2 partially overlap each other and an overlap region W has a width of four pixels. The patch pair generation unit 130 may generate the sub-pixel shifted blurred patch by generating the restoration patch by using a shift method shown in FIG. 4.

Specifically, the patch pair generation unit 130 extracts the blurred patch (represented by P1 temporarily) located at a patch position that relatively corresponds to the patch position of the restoration patch Y1 in the image X from the blurred image and extracts the blurred patch (represented by P2 temporarily) whose position is shifted from the blurred patch P1 by one sub-pixel (that corresponds to one pixel shift in the learning image) from the blurred image. The patch pair generation unit 130 may generate the patch pair composed of the restoration patch Y1 and the blurred patch P1 and the patch pair composed of the restoration patch Y2 and the blurred patch P2.

Further, in FIG. 3 and FIG. 4, although one patch is composed of twenty-five pixels, the scope of the present invention is not limited to this example. One patch may be composed of 36 pixels (6×6 pixels), the number of pixels of which one patch is composed is not limited to this number, and an arbitrary number of pixels may be used for one patch.

Further, the patch pair generation method performed by the patch pair generation unit 130 is not limited to the sub-pixel shift method mentioned above. The patch pair may be generated by using a method by which one patch is shifted from the other by three pixel columns. Further, the patch pair generation method is not limited to this method. The patch pair generation unit 130 may generate the patch pair by shifting the patch by an arbitrary number of pixel columns.

The registration unit 140 receives a plurality of the patch pairs from the patch pair generation unit 130. The registration unit 140 associates a plurality of the patch pairs with the blur parameter corresponding to the blurred patch in the patch pair and registers them in the dictionary 200.

The dictionary 200 stores a plurality of the patch pairs and the blur parameter that are generated by the learning device 100.

Figure 5:
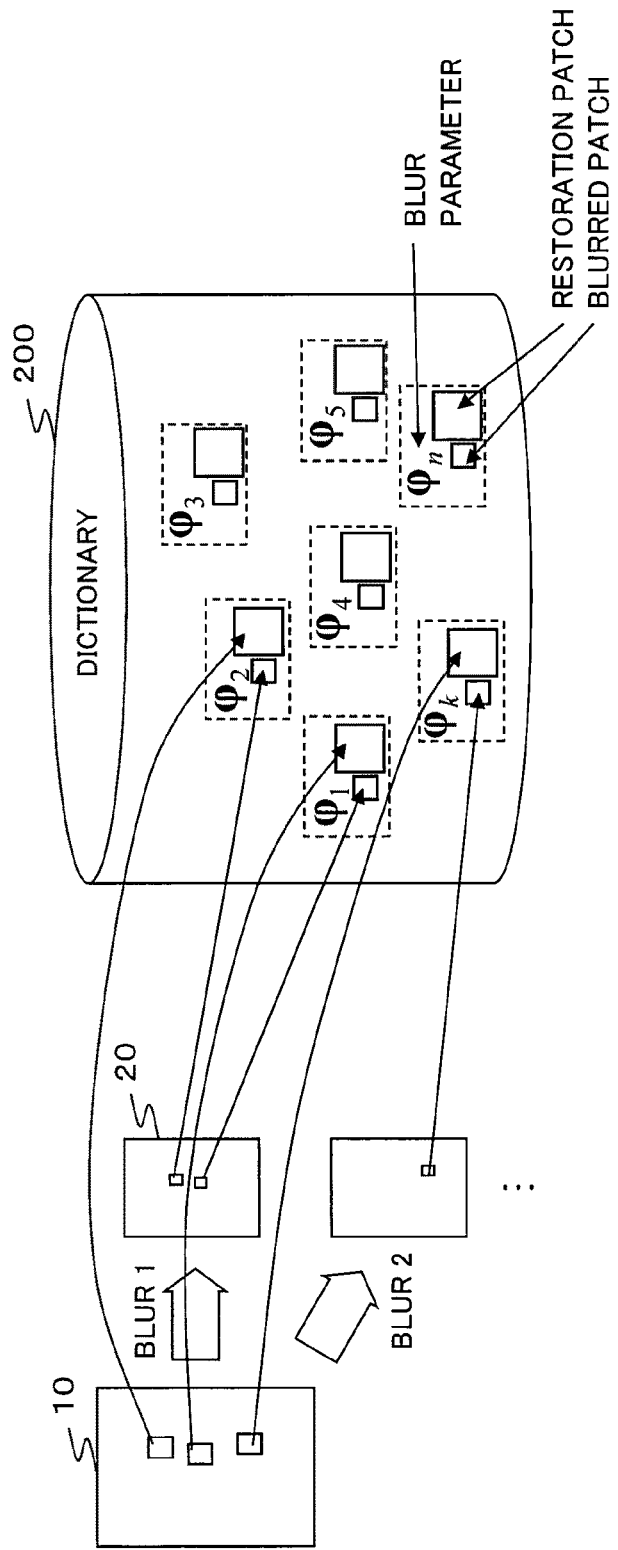
FIG. 5 is a conceptual diagram for explaining a learning phase in the first exemplary embodiment.

FIG. 5 is a conceptual diagram for explaining a learning phase in a first exemplary embodiment. As shown in FIG. 5, the learning device 100 may perform one or more blurring processes to a learning image 10 and generate the blurred image. In FIG. 5, the learning device 100 performs the various blurring processes of "blur 1", "blur 2", . . . , and others. The learning device 100 registers a pair of the patches located at the corresponding positions of the learning image 10 and a blurred image 20 in the dictionary 200 together with the blur parameter.

Figure 6:
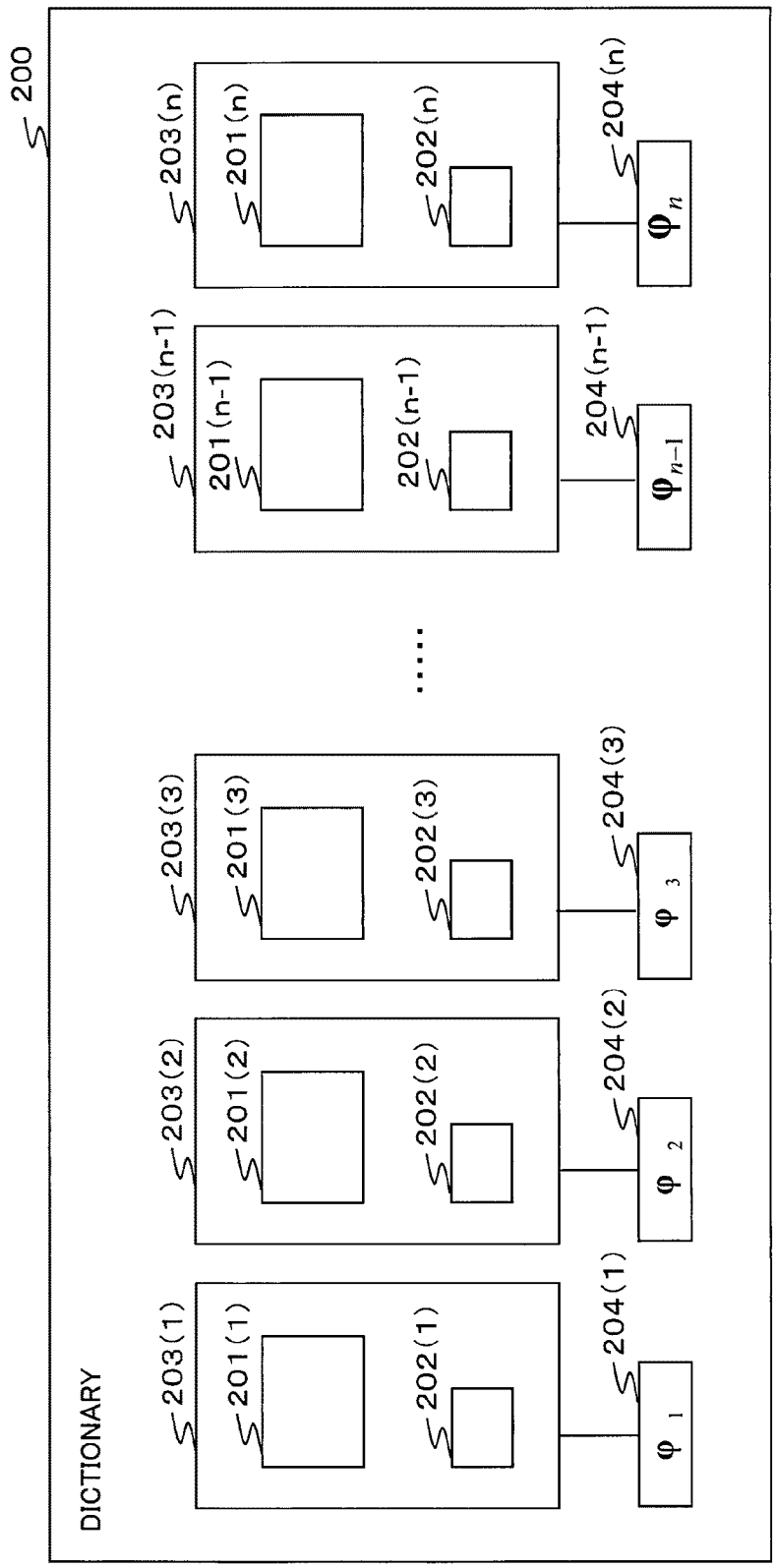
FIG. 6 is a conceptual diagram for explaining a state in which a patch pair and a blur parameter are stored in a dictionary according to the first exemplary embodiment.

FIG. 6 is a conceptual diagram for explaining a state in which the patch pair and the blur parameter are stored in the dictionary 200. As shown in FIG. 6, the dictionary 200 stores the restoration patches 201(1), 201(2), 201(3), . . . , 201(n−1), and 201(n). Further, the dictionary 200 stores the blurred patches 202(1), 202(2), 202(3), . . . , 202(n−1), and 202(n) corresponding to the restoration patch 201. Namely, the dictionary 200 stores the patch pairs 203(1), 203(2), 203(3), . . . , 203(n−1), and 203(n) which are the pairs composed of the restoration patch 201 and the blurred patch 202. Further, the dictionary 200 associates the blur parameters 204(1), 204(2), 204(3), . . . , 204(n−1), and 204(n) with the patch pairs and stores them. Here, n is an integer.

A method for storing the patch pair and the blur parameter in the dictionary 200 is not limited to the method shown in FIG. 6 by which each patch is associated and stored. For example, the dictionary 200 may store the learning data by using an aspect in which the learning image is stored as one image instead of the patch and an index indicating a corresponding region of the restored image and the corresponding blur parameter for each blurred patch is given. Further, the dictionary 200 may store the learning data by using another method. In this case, a structure of the patch may be a structure compatible with the method for storing the patch pair in the dictionary 200.

Figure 7:
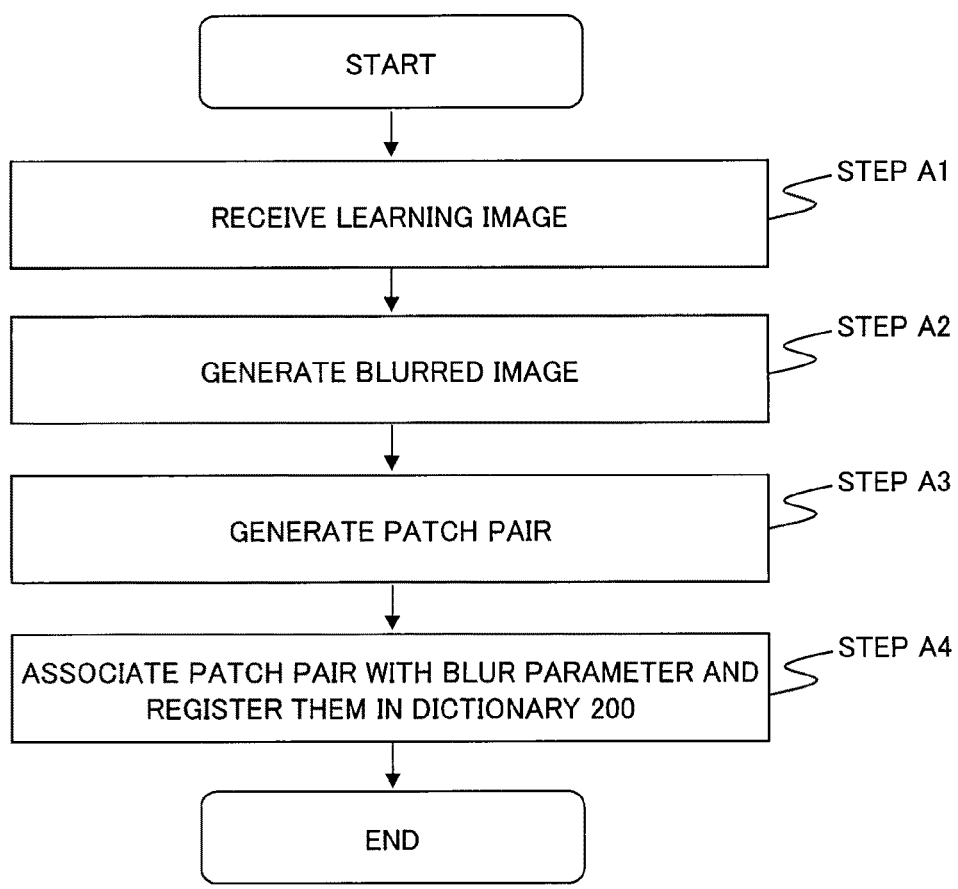
FIG. 7 is a flowchart showing operation of a learning device according to the first exemplary embodiment.

Next, the operation of the learning device 100 will be described with reference to the drawing. FIG. 7 is a flowchart showing the operation of the learning device 100.

The reception unit 110 receives the learning image from outside (Step A1).

The blurred image generation unit 120 performs the blurring process to the learning image outputted from the reception unit 110 and generates the blurred image (Step A2).

The patch pair generation unit 130 generates a plurality of the patch pairs, each of which is composed of the patches located at the corresponding positions of the learning image and the blurred image and outputs them to the registration unit 140 (Step A3).

The registration unit 140 associates a plurality of the patch pairs with the blur parameter and registers them in the dictionary 200 (Step A4).

The operation of the learning device 100 which creates the dictionary 200 has been explained above.

(Restoration Phase)

A restoration phase in the first exemplary embodiment of the present invention will be described with reference to FIGS. 8 to 11.

Figure 8:
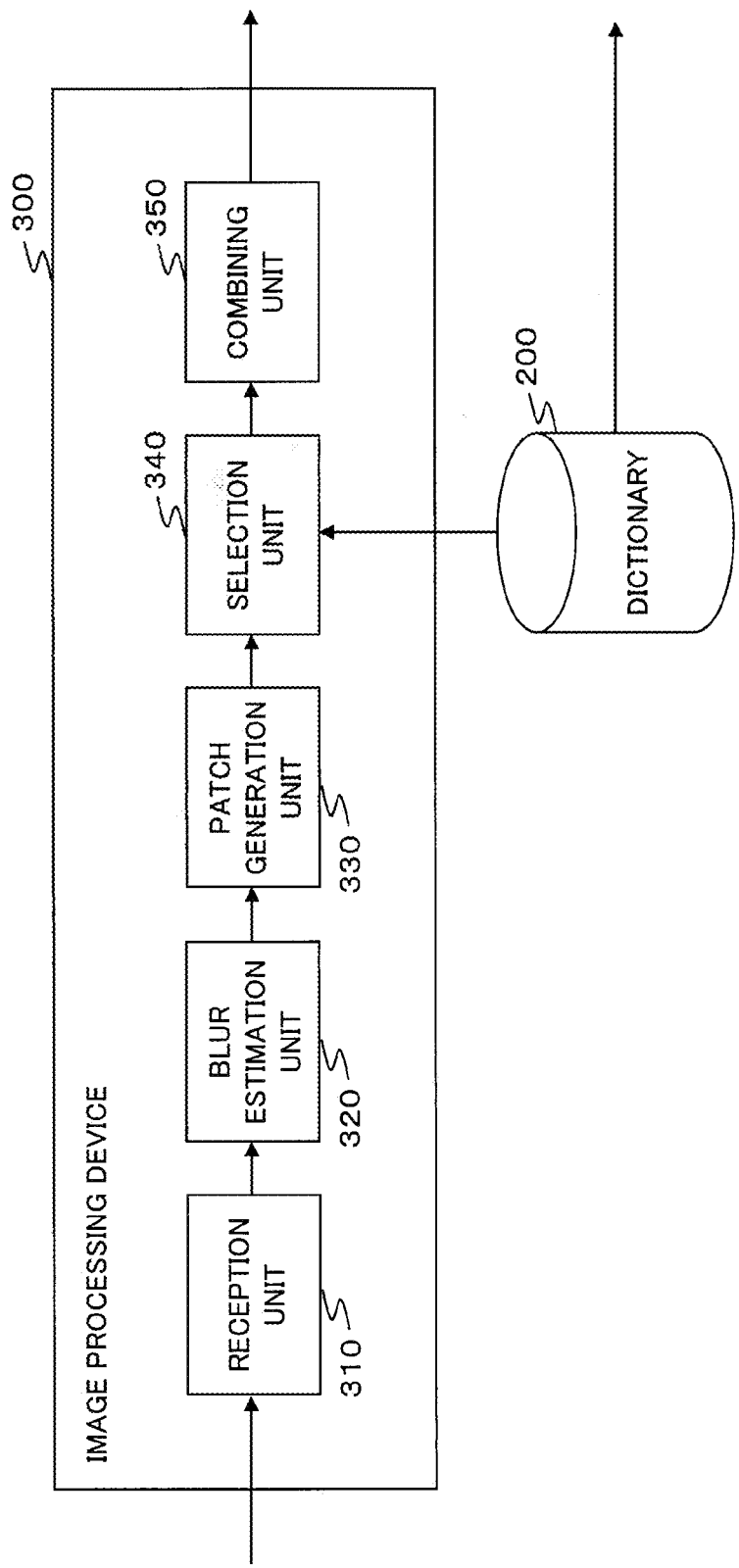
FIG. 8 is a block diagram showing a configuration of an image processing device according to the first exemplary embodiment.

FIG. 8 is a block diagram showing a configuration of the image processing device 300. As shown in FIG. 8, the image processing device 300 includes a reception unit 310, a blur estimation unit 320, a patch generation unit 330, a selection unit 340, and a combining unit 350. The image processing device 300 generates the restored image by using the dictionary 200.

The image processing device 300 receives the input image that is an object of the image processing from outside, performs the image processing to the input image, and generates the restored image. Specifically, the image processing device 300 selects the restoration patch based on the similarity between a plurality of the patches (the input patches) generated by dividing the input image into blocks and the blurred patch stored in the dictionary 200. Next, the image processing device 300 combines a plurality of the selected restoration patches and generates the restored image. The detailed explanation about the similarity between the input patch and the blurred patch will be given later.

The reception unit 310 receives the input image that is the object of the image processing from outside. The reception unit 310 may be connected to a network and receive the input image. Alternatively, the reception unit 310 may read the input image from a memory storing it and receive the input image. A mode for receiving the input image is not limited to these methods. The reception unit 310 outputs the received input image to the blur estimation unit 320.

The blur estimation unit 320 estimates the blur parameter indicating the blurring state of the image with respect to the input image received from the reception unit 310. As mentioned above, the blur parameter may include a value indicating at least one of for example, a scaling factor, lightness, a degree of blur, and a posture slope.

The blur estimation unit 320 may calculate the scaling factor based on for example, an aspect ratio of the input image and an aspect ratio of the learning image stored in the dictionary 200. For example, the blur estimation unit 320 may calculate the lightness based on the average value of the brightness values of the input image. For example, the blur estimation unit 320 may calculate the degree of blur based on the magnitude of the high frequency component of the input image. For example, the blur estimation unit 320 may calculate the posture slope by estimating a direction. When the input image is for example, a face image, the blur estimation unit 320 may estimate a face direction by using an existing face direction estimation technology and calculate the posture slope.

The blur estimation unit 320 may estimate the blur parameter of the input image by the above-mentioned various methods. The method for estimating blur is not limited to these methods.

The blur estimation unit 320 outputs the input image and the blur parameter estimated with respect to the input image to the patch generation unit 330.

The patch generation unit 330 receives the input image and the blur parameter of the input image from the blur estimation unit 320. The patch generation unit 330 divides the input image into blocks and generates a plurality of patches (input patches). A plurality of the generated patches have the corresponding blur parameters, respectively. The patch generation unit 330 outputs the generated input patches that have a plurality of the blur parameters to the selection unit 340.

Further, the processes performed by the blur estimation unit 320 and the patch generation unit 330 may be performed in reverse order. Namely, first, the patch generation unit 330 generates the input patch and after that, the blur estimation unit 320 estimates the blur parameter for each input patch.

The selection unit 340 receives a plurality of input patches from the patch generation unit 330. The selection unit 340 selects the restoration patch for each of a plurality of input patches from among the data of the patch pair stored in the dictionary 200 based on a value indicating the similarity between the input patch and the blurred patch in the dictionary 200 and a value indicating the similarity of the blur parameter. Hereinafter, in order to discriminate from the similarity of the blur parameter, the similarity between the input patch and the blurred patch in the dictionary 200 is referred to as a feature similarity. Here, a value indicating the feature similarity between the input patch and the blurred patch is called a blur similarity value. Further, a value indicating the similarity of the blur parameter between the input patch and the blurred patch is called a blur parameter similarity value. The feature similarity between two patches will be described later.

The selection unit 340 selects a patch not only which is similar as a patch but also of which the degrees of blur is similar by taking into consideration the blur similarity value and the blur parameter similarity value. The selection unit 340 selects the patch of which the degrees of blur are similar and whereby the selection unit 340 selects a correct patch as a restoration patch.

The selection unit 340 may select the restoration patch based on a value obtained by integrating the blur similarity value and the blur parameter similarity value. Namely, the selection unit 340 may calculate the blur similarity value and the blur parameter similarity value with respect to the combination of the patches at one time, calculate the value obtained by integrating the blur similarity value and the blur parameter similarity value for each patch, and select the most appropriate restoration patch. As the value obtained by integrating the blur similarity value and the blur parameter similarity value, for example, a sum of these values, an adjustment value of these values, or the like may be used.

Alternatively, the selection unit 340 may select the restoration patch in only a range in which it is shown that the blur parameter is similar that is determined by a comparison between the value indicating the similarity of the blur parameter and a predetermined threshold value. Namely, the selection unit 340 may perform a threshold process of the blur parameter similarity value once, calculate the blur similarity value with respect to only the patch which belongs to a range in which it is determined that the degree of blur is similar, and select the restoration patch.

The selection unit 340 outputs a plurality of the selected restoration patches to the combining unit 350.

The combining unit 350 combines a plurality of the restoration patches received from the selection unit 340 and generates the restored image.

Figure 9:
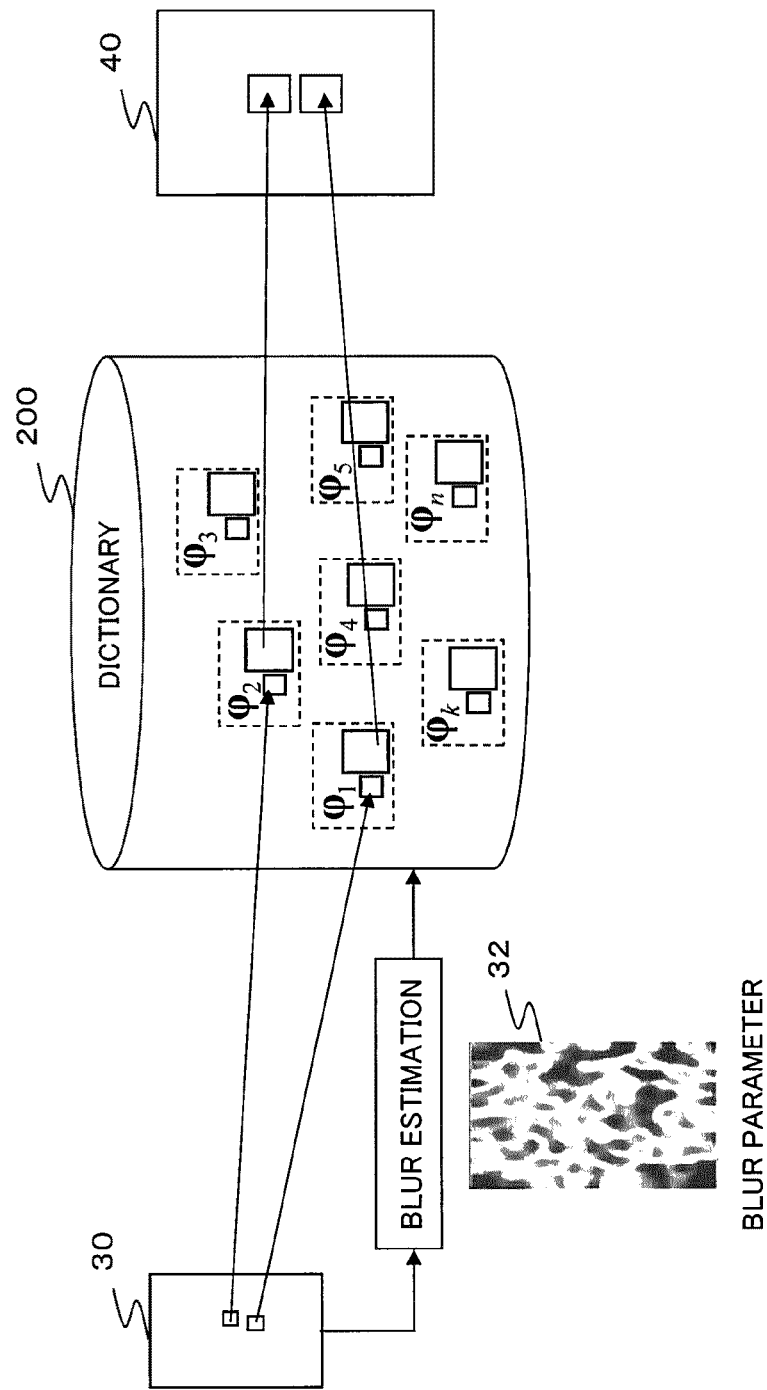
FIG. 9 is a conceptual diagram for explaining a restoration phase in the first exemplary embodiment.

FIG. 9 is a conceptual diagram for explaining the restoration phase. As shown in FIG. 9, the image processing device 300 estimates a blur parameter 32 of an input image 30 and selects the restoration patch in a restored image 40 by taking into consideration the feature similarity between the input patch and the blurred patch in the dictionary 200 and the similarity of the blur parameter 32.

Next, the similarity between two patches (for example, the input patch and the blurred patch) will be described.

Figure 10:
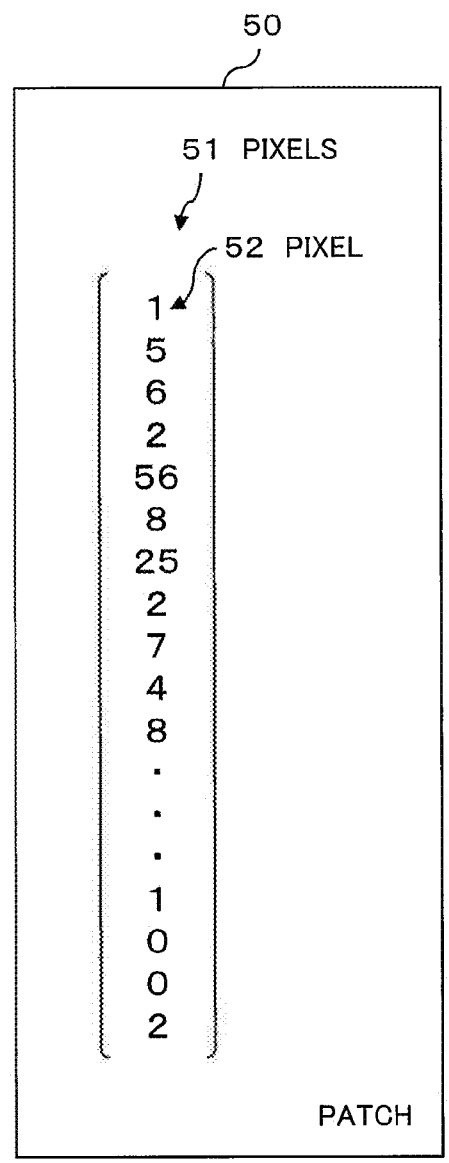
FIG. 10 is a figure showing an example of a patch in the first exemplary embodiment.

FIG. 10 is a figure showing an example of a patch 50. As shown in FIG. 10, the patch 50 includes pixels 51 that is a multidimensional vector which has the pixel values of a plurality of pixels 52 as an element. Further, the patch 50 is a concept including the restoration patch, the blurred patch, and the input patch. Further, the pixel value may be a brightness value. However, the pixel value is not limited to this value.

In this case, the value indicating the feature similarity between two patches may be a value based on the difference of the brightness values of the pixels between two patches. For example, the value indicating the feature similarity between two patches may be a value based on a SSD (Sum of Square Distance) that is a sum of squares of the difference of the brightness values of the pixels between the patches. Alternatively, the value indicating the feature similarity between two patches may be a value based on a SAD (Sum of Absolute Distance) that is an absolute value sum of the difference of the brightness values of the pixels between two patches.

Further, for example, the value indicating the feature similarity between two patches may be a value based on an angle between two feature vectors. Further, the value indicating the feature similarity between two patches may be a value calculated by using a normalized cross-correlation function. The value indicating the feature similarity between two patches is not limited to these values. However, the value indicating the similarity of the blur parameter between two patches is not limited to these values. Further, the similarity may be a value calculated based on a brightness gradient of the patch. Further, after creating a histogram of the brightness value or the value of the brightness gradient, a value calculated based on a distance of the histogram may be used as the similarity.

Namely, the similarity between two patches is the similarity between the images represented by the respective pixels of two patches.

On the other hand, it is assumed that the blur parameter of each patch is configured as a parameter group which has a plurality of blur parameters such as a scaling factor, lightness, and the like as a vector. In this case, the value indicating the similarity of the blur parameter between two patches may be a value based on the difference of the blur parameters between the patches. For example, the value indicating the similarity of the blur parameter between two patches may be a value calculated as follows. First, the absolute value of the difference of the blur parameters between the patches is calculated. Next, the calculated absolute value is substituted in a function having a nonzero value when the value is equal to or greater than a constant value. Lastly, the sum of the function values calculated for each blur parameter is used as the value indicating the similarity of the blur parameter between two patches. For example, a sigmoid function in which the difference of the blur parameters between the patches is used as an argument or the like is used as the function having a nonzero value when the value is equal to or greater than a constant value.

Alternatively, the value indicating the similarity of the blur parameter between two patches may be a value calculated by using a method that is the same as the method for calculating the value indicating the feature similarity between two patches.

Namely, the value indicating the similarity of the blur parameter between two patches may be a value based on the SSD that is a sum of squares of the differences of the blur parameters between the patches. Further, the value indicating the similarity of the blur parameter between two patches may be a value based on the SAD that is an absolute value sum of the differences of the blur parameters between the patches. Further, for example, the value indicating the similarity of the blur parameter between two patches may be an angle between two vectors indicating the blur parameter. Further, the value indicating the similarity of the blur parameter between two patches may be a value calculated by the normalized cross-correlation function. However, the value indicating the similarity of the blur parameter between two patches is not limited to these values.

Further, when the blur parameter is a discrete value, by using a function which has a value of zero when the values are equal to each other and has a nonzero value when the values are not equal to each other, the similarity of the blur parameter between two patches may be calculated for each component. However, the value indicating the similarity of the blur parameter between two patches is not limited to these values.

Figure 11:
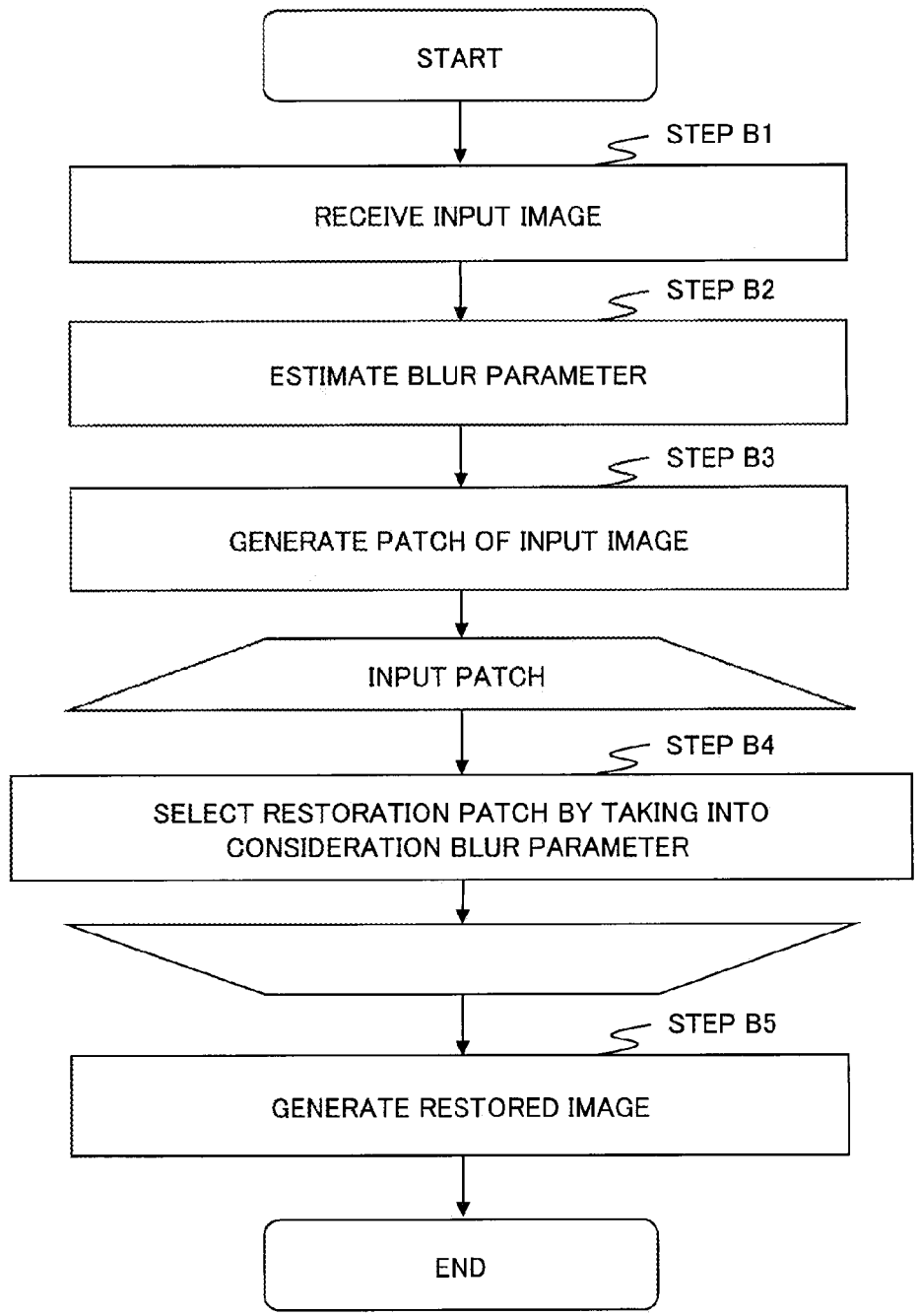
FIG. 11 is a flowchart showing operation of the image processing device according to the first exemplary embodiment.

Next, the operation of the image processing device 300 will be described in detail with reference to the drawing. FIG. 11 is a flowchart showing the operation of the image processing device 300.

The reception unit 310 receives the input image that is an object of the image processing from outside (Step B1).

The blur estimation unit 320 estimates the blur parameter indicating the blurring state of the image with respect to the input image received from the reception unit 310 (Step B2).

The patch generation unit 330 divides the input image outputted from the reception unit 310 into blocks and generates a plurality of patches (input patches) (Step B3). For example, the patch generation unit 330 may use a region composed of twenty-five pixels that are two-dimensionally arranged in a matrix shape in which five pixels are arranged in a vertical direction and five pixels are arranged in a horizontal direction as a patch unit of the input patch. In this case, the patch generation unit 330 may generate the input patch of which one patch is shifted from the other by 1 pixel column so that both the patches are adjacent to each other with respect to the input image. Further, the number of pixels included in the patch region and the number of pixel columns to be shifted are not limited to these numbers. For example, the patch generation unit 330 may generate the input patch of which one patch is shifted from the other by 3 pixel columns so that both the patches are adjacent to each other. Further, the smaller the number of pixel columns to be shifted from the input patch to obtain the adjacent patch is (the larger the overlap region between two patches that are adjacent to each other is), the more accurate the combining process for generating the restored image can be performed.

The selection unit 340 searches for the blurred patch which is similar to the input patch and of which the degree of blur is similar to that of the input patch based on the blur similarity value and the blur parameter similarity value and selects the restoration patch that is paired with the blurred patch that is searched for (Step B4). For example, the selection unit 340 may search for the blurred patch of which the SSD value or the SAD value is smaller than that of the input patch and a value of the blur parameter is approximate equal to that of the input patch in the dictionary 200, selects the restoration patch corresponding to the blurred patch that is searched for, and output it.

The process of Step B4 is repeatedly performed with respect to the input patch generated from the input image.

Further, in the process of Step B4, one blurred patch which is similar to the input patch and of which the degree of blur is similar to that of the input patch is searched for. However, the operation in Step B4 is not limited to this operation. For example, the selection unit 340 may combine a plurality of restoration patches that are considered to be appropriate by taking into consideration the blur similarity value and the blur parameter similarity value and generate the restoration patch newly. Further, specifically, the process for "combining the images (patches)" may be a process for "calculating an average value of the pixel values of the image (patch) that is an object of the combining".

Next, the combining unit 350 combines a plurality of the restoration patches outputted by the selection unit 340 and generates the restored image (Step B5). Here, the "combining" process may be a process for calculating an average value of the pixel values as mentioned above. Specifically, the "combining" process may be a process for calculating an average value of the pixel values of the overlapping restoration patches with respect to the overlap region when the restoration patch is placed at the relatively same position as the position of the input patch.

The operation of the image processing device 300 has been explained above. As explained above, by using the image processing system 1000 according to the first exemplary embodiment, the restoration patch can be flexibly selected according to the type of blur.

The reason is because the learning device 100 creates the dictionary 200 which stores the blur parameter together with the patch pair. Further, the image processing device 300 selects the more appropriate restoration patch by taking into consideration not only the similarity of the patch but also the similarity of the blur parameter of the patch.

Second Exemplary Embodiment

A second exemplary embodiment of the present invention will be described with reference to FIG. 12 and FIG. 13. The second exemplary embodiment of the present invention includes an image processing device 400 although the first exemplary embodiment includes the image processing device 300. This is a difference between the first exemplary embodiment and the second exemplary embodiment.

Figure 12:
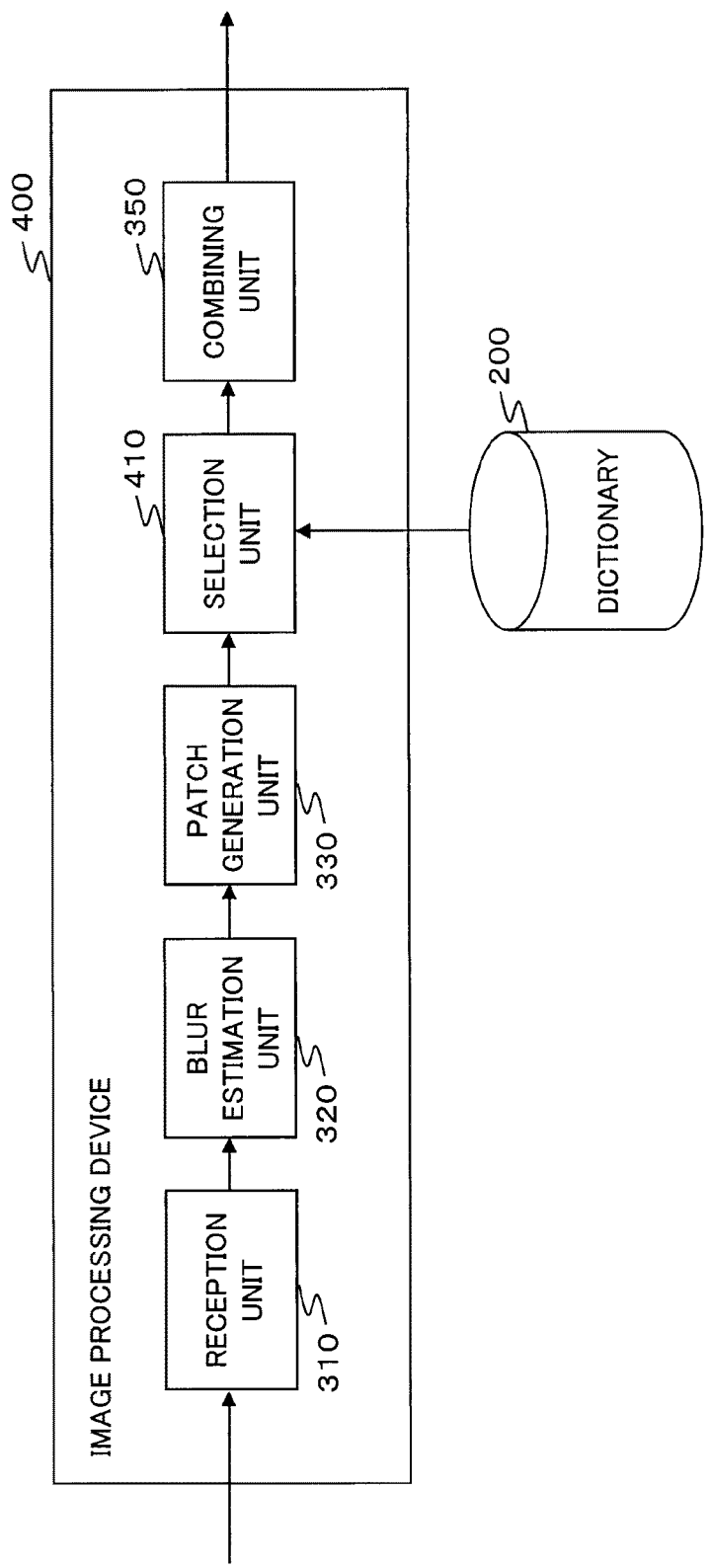
FIG. 12 is a block diagram showing a configuration of an image processing device according to a second exemplary embodiment.

FIG. 12 is a block diagram showing a configuration of the image processing device 400 according to the second exemplary embodiment of the present invention. As shown in FIG. 12, the image processing device 400 includes a selection unit 410 although the image processing device 300 shown in FIG. 8 includes the selection unit 340.

The selection unit 410 selects the restoration patch for each of a plurality of the input patches from among the data of the patch pair stored in the dictionary 200 based on the blur similarity value and the blur parameter similarity value like the selection unit 340. At this time, the selection unit 410 calculates the blur parameter similarity value by a value weighted by a weighting factor set for each blur parameter. In other words, the selection unit 410 performs weighting for each blur parameter and calculates the blur parameter similarity value.

For example, it is assumed that the blur parameter includes the values indicating a scaling factor, lightness, a degree of blur, and a posture slope. In this case, generally, the values indicating the scaling factor and the lightness can be easily calculated compared with the values indicating the degree of blur and the posture slope and the reliability of the values indicating the scaling factor and the lightness is high as the blur parameter. Therefore, the selection unit 410 may apply a high weighting factor to the blur parameters of the scaling factor and the lightness so that the values of the scaling factor and the lightness have a large influence on the selection of the restoration patch compared to the degree of blur and the posture slope.

Alternatively, the selection unit 410 may receive an input of a setting value of the weighting factor for each blur parameter from the user. In this case, the selection unit 410 selects the restoration patch based on the blur similarity value and the blur parameter similarity value that is calculated based on the blur parameter having the weighting factor set by the user.

Further, as mentioned above, the blur parameter of each patch is configured as a parameter group which has a plurality of blur parameters such as the scaling factor, the lightness, and the like as a vector and the blur parameter similarity value may be obtained as follows, first, an absolute value of the difference of the blur parameters between the patches is calculated, next, the calculated absolute value is substituted in a function which has a nonzero value when the value is equal to or greater than a constant value, and lastly, the function value calculated for each blur parameter is weighted for each blur parameter and the sum of the weighted values is calculated and used as the blur parameter similarity value. Further, the value may be a value based on the SSD of each blur parameter between the patches. Further, the blur parameter similarity value may be a value based on the SAD of each blur parameter between the patches. Further, for example, the blur parameter similarity value may be an angle between the vectors representing two blur parameters. Further, the blur parameter similarity value may be a value calculated by the normalization cross correlation function. The blur parameter similarity value is not limited to these values.

Figure 13:
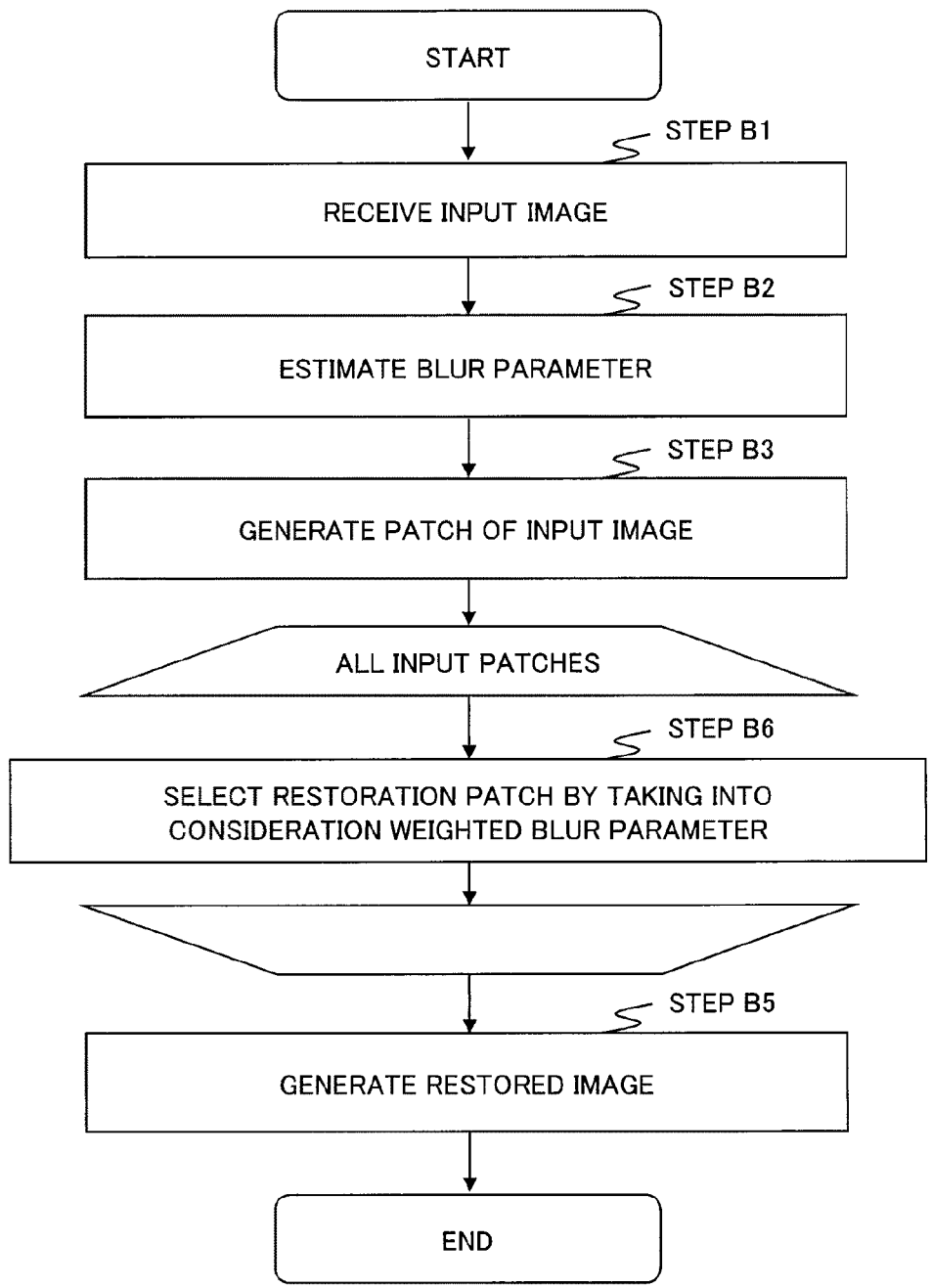
FIG. 13 is a flowchart showing operation of the image processing device according to the second exemplary embodiment.

FIG. 13 is a flowchart showing the operation of the image processing device 400. As shown in FIG. 13, the image processing device 400 performs the process of Step B6 although the image processing device 300 performs the process of Step B4. This is a difference between the operations of the image processing device 400 and the image processing device 300.

In Step B6, the selection unit 410 calculates the blur parameter similarity by a value weighted by a weighting factor set for each blur parameter and selects the restoration patch based on the blur parameter similarity value calculated by using the weighted blur parameter and the blur similarity value.

As described above, by using the image processing device 400 according to the second exemplary embodiment, the restoration patch can be flexibly selected according to the type of blur because a difference between the blur parameter to be taken into consideration and the blur parameter not to be taken into consideration is provided.

The reason is because the selection unit 410 selects the restoration patch by taking into consideration the weighting factor set for each blur parameter. Namely, when certainty of the blur estimated by the blur estimation unit 320 is high, the selection unit 410 searches for the patch pair generated in the latest blurring process and selects the restoration patch. Alternatively, the selection unit 410 receives the input of the weighting factor set by a user for each blur parameter.

Third Exemplary Embodiment

Next, a functional configuration of a learning device 500 according to a third exemplary embodiment of the present invention will be described with reference to FIG. 14 and FIG. 15.

Figure 14:
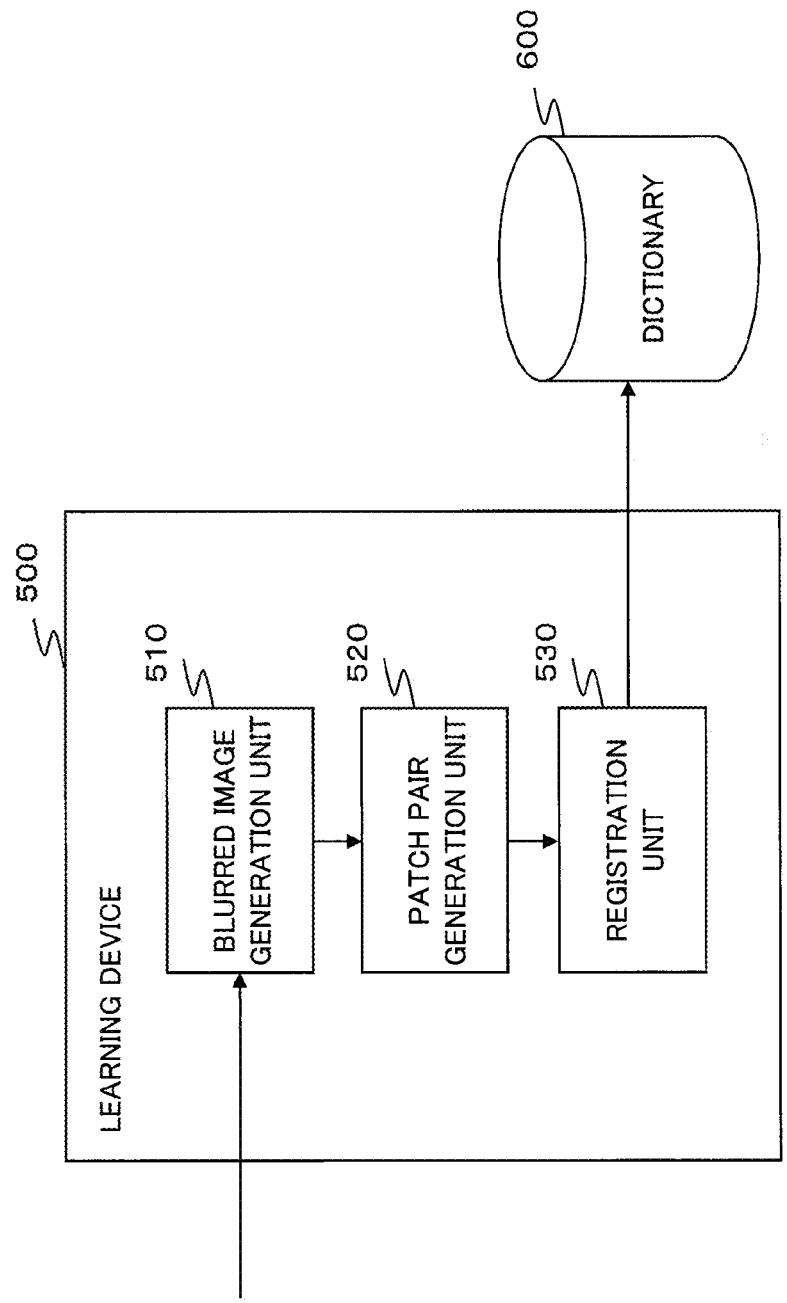
FIG. 14 is a block diagram showing a configuration of a learning device according to a third exemplary embodiment.

FIG. 14 is a block diagram showing a configuration of the learning device 500 according to the third exemplary embodiment. As shown in FIG. 14, the learning device 500 includes a blurred image generation unit 510, a patch pair generation unit 520, and a registration unit 530. The learning device 500 performs the learning phase and creates a dictionary 600. Further, the configurations of the blurred image generation unit 510, the patch pair generation unit 520, and the registration unit 530 may be the same as those of the blurred image generation unit 120, the patch pair generation unit 130, and the registration unit 140 in the learning device 100 according to the first exemplary embodiment, respectively. Further, the configuration of the dictionary 600 may be the same as that of the dictionary 200.

The blurred image generation unit 510 outputs the blurred image obtained by performing the blurring process to the learning image that is the image before the blurring process together with the blur parameter indicating the blurring state of the blurred image.

The patch pair generation unit 520 generates the restoration patch that is the patch of the learning image and the blurred patch that is the patch of the blurred image as the patch pair that is composed of the patches located at the corresponding positions of the learning image and the blurred image.

The registration unit 530 associates the patch pair with the blur parameter corresponding to the blurred patch in the patch pair and registers them in the dictionary 600.

Figure 15:
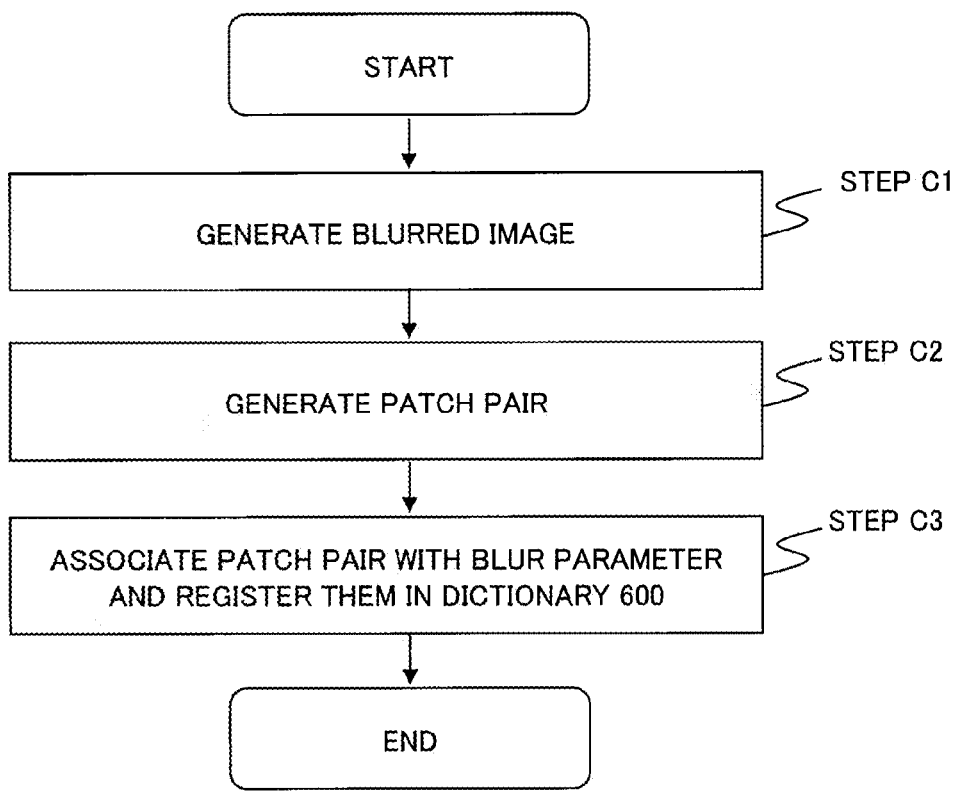
FIG. 15 is a flowchart showing operation of a learning device according to the third exemplary embodiment.

FIG. 15 is a flowchart showing the operation of the learning device 500 according to the third exemplary embodiment. As shown in FIG. 15, the blurred image generation unit 510 outputs the blurred image generated by performing the blurring process to the learning image that is the image before the blurring process together with the blur parameter indicating the blurring state of the blurred image (Step C1).

The patch pair generation unit 520 generates the restoration patch that is the patch of the learning image and the blurred patch that is the patch of the blurred image as the patch pair that is composed of the patches located at the corresponding positions of the learning image and the blurred image (Step C2).

The registration unit 530 associates the patch pair with the blur parameter corresponding to the blurred patch in the patch pair and registers them in the dictionary 600 (Step C3).

As described above, by using the learning device 500 according to the third exemplary embodiment, the dictionary 600 in which the restoration patch can be flexibly selected according to the type of blur can be created.

Fourth Exemplary Embodiment

Next, a functional configuration of an image processing device 700 according to a fourth exemplary embodiment of the present invention will be described with reference to FIG. 16 and FIG. 17.

Figure 16:
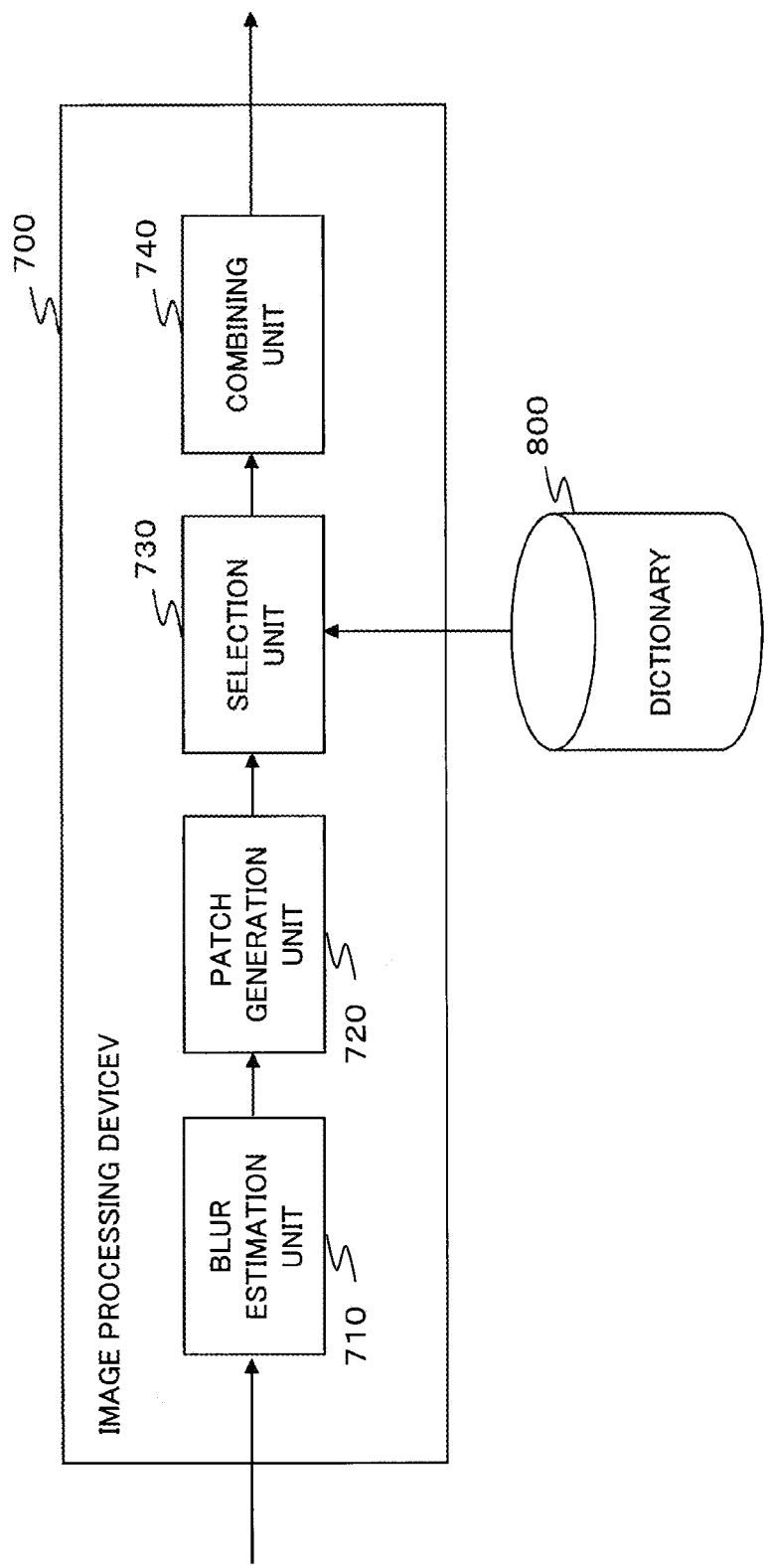
FIG. 16 is a block diagram showing a configuration of an image processing device according to a fourth exemplary embodiment.

FIG. 16 is a block diagram showing the configuration of the image processing device 700 according to the fourth exemplary embodiment. As shown in FIG. 16, the image processing device 700 includes a blur estimation unit 710, a patch generation unit 720, a selection unit 730, and a combining unit 740. The image processing device 700 performs the restoration phase by using a dictionary 800. Further, the configurations of the blur estimation unit 710, the patch generation unit 720, the selection unit 730, and the combining unit 740 may be the same as those of the blur estimation unit 320, the patch generation unit 330, the selection unit 340, and the combining unit 350 of the image processing device 300 according to the first exemplary embodiment, respectively. Further, the configuration of the dictionary 800 may be the same as that of the dictionary 200.

The dictionary 800 stores two or more sets of data in which the blurred patch that is the patch of the blurred image generated from the learning image that is the learning image that is the image before the blurring process, the restoration patch that is the patch of the learning image, and the blur parameter of the blurred patch are associated with each other.

The blur estimation unit 710 estimates the value of the blur parameter indicating the blurring state with respect to the input image that is the image received from outside.

The patch generation unit 720 divides the input image and generates a plurality of input patches.

The selection unit 730 refers to the dictionary 800 and selects the restoration patch for each input patch based on the value indicating the feature similarity and the value indicating the similarity of the blur parameter between the input patch and the blurred patch in the dictionary 800.

Further, as mentioned above, the value indicating the similarity of the blur parameter between the input patch and the blurred patch may be the SSD value or the SAD value of each blur parameter between the patches, the angle between the vectors, the value calculated by the normalized cross-correlation function, or the like and it is not limited to these values.

The combining unit 740 combines the restoration patches selected for each input patch and generates the restored image.

Figure 17:
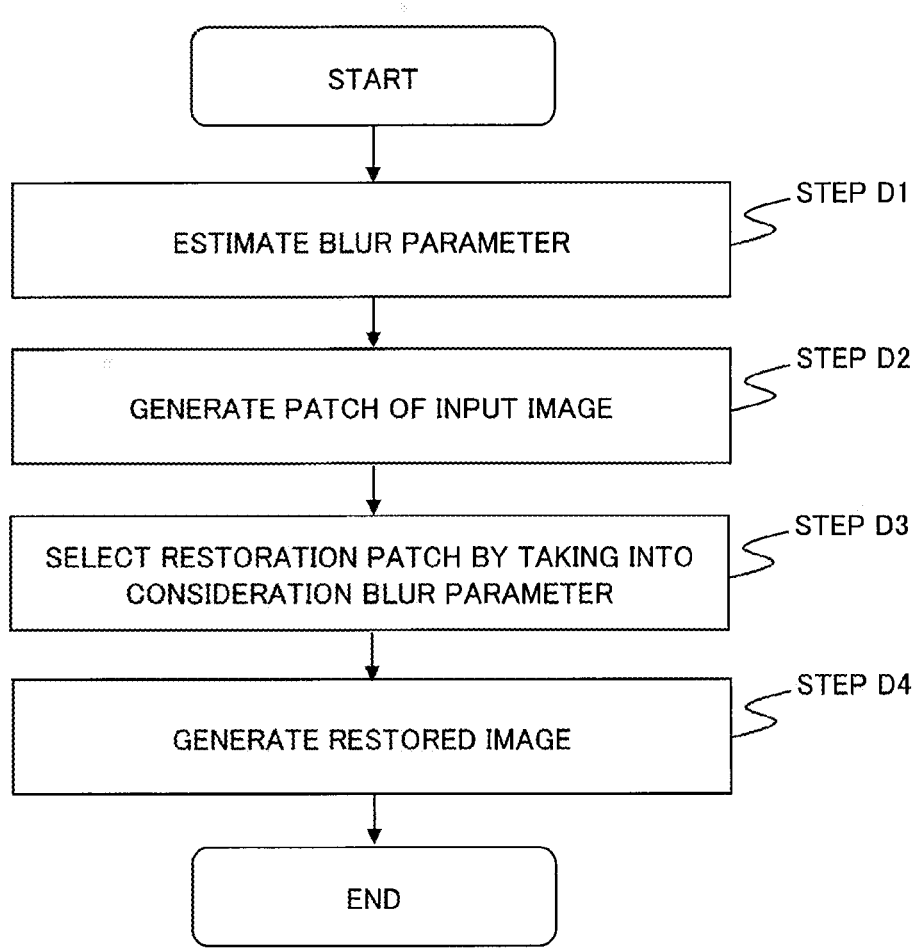
FIG. 17 is a flowchart showing operation of the image processing device 700 according to the fourth exemplary embodiment.

FIG. 17 is a flowchart showing the operation of the image processing device 700 according to the fourth exemplary embodiment. As shown in FIG. 17, the blur estimation unit 710 estimates the value of the blur parameter indicating the blurring state with respect to the input image that is the image received from outside (Step DO.

The patch generation unit 720 divides the input image and generates a plurality of input patches (Step D2).

The selection unit 730 refers to the dictionary 800 storing two or more sets of data in which the blurred patch that is the patch of the blurred image generated from the learning image that is the image before the blurring process, the restoration patch that is the patch of the learning image, and the blur parameter of the blurred patch are associated with each other and selects the restoration patch for each input patch based on the value indicating the feature similarity and the value indicating the similarity of the blur parameter between the input patch and the blurred patch in the dictionary 800 (Step D3).

The combining unit 740 combines the restoration patches selected for each input patch and generates the restored image (Step D4).

As described above, by using the learning device 700 according to the fourth exemplary embodiment, the restoration patch can be flexibly selected according to the type of blur.

The present invention has been explained above with reference to each exemplary embodiment. However, the present invention is not limited to the above mentioned exemplary embodiment. Various changes in the configuration or details of the present invention that can be understood by those skilled in the art can be made without departing from the scope of the present invention.

Next, the component of the image processing device 300 according to the present invention will be described for each hardware unit.

FIG. 18 is a figure showing a hardware configuration of the image processing device 300 according to the first exemplary embodiment and a peripheral device.

Here, the image processing device 300 is explained as an example. However, the learning devices 100 and 500 and the image processing devices 400 and 700 may be realized by using the hardware configuration shown in FIG. 18.

As shown in FIG. 18, the image processing device 300 includes a CPU (Central Processing Unit) 1, a storage unit 2, a storage device 3, and a communication unit 4. Further, the image processing device 300 is connected to an input unit 5 and an output unit 6.

The CPU 1 operates an operating system (not shown) and controls the entire operation of the image processing device 300. Further, for example, the CPU 1 reads a program (for example, a program which causes a computer to execute the operation of the flowchart shown in FIG. 11) and data from a non-volatile recording medium (not shown) installed in the storage device 3 and writes the read program and data into the storage unit 2. The CPU 1 executes the various processes as the reception unit 310, the blur estimation unit 320, the patch generation unit 330, the selection unit 340, and the combining unit 350 shown in FIG. 8 according to the read program based on the read data.

Further, the CPU 1 may download the program and the data to the storage unit 2 from an external computer (not shown) connected to a communication network (not shown).

The storage unit 2 stores the program and the data.

The storage device 3 is for example, an optical disc, a flexible disc, a magnetic optical disc, an external hard disk, or a semiconductor memory and includes a non-volatile storage medium. The storage device 3 records the program in a computer-readable form. Further, the storage device 3 may record the data in a computer-readable form.

The communication unit 4 realizes an interface between the network and the image processing device 300. For example, the image processing device 300 may be connected to the dictionary 200 via the communication unit 4.

The input unit 5 is realized by for example, a mouse, a keyboard, a built-in key button, and the like and used for an input operation. The input unit 5 is not limited to the mouse, the keyboard, and the built-in key button. It may be for example, a touch panel, an accelerometer, a gyro sensor, a camera or the like.

The output unit 6 is realized by for example, a display and used for checking an output power.

Each component of the image processing device 300 has been explained above for each hardware unit.

As explained above, the functional unit block shown in FIG. 8 is realized by using a hardware configuration shown in FIG. 18. However, means for realizing each unit provided in the image processing device 300 is not limited to the above-mentioned means. Namely, the image processing device 300 may be realized by using one device that is physically connected. Further, the image processing device 300 may be realized by a plurality of devices that are two or more devices physically separated and connected to each other by wire or wireless.

Further, the recording medium (or the storage medium) recording the above-mentioned program may be supplied to the image processing device 300 and the image processing device 300 may read the program stored in the recording medium and execute it. Namely, the exemplary embodiment of the present invention includes an exemplary embodiment of a recording medium that stores the program executed by the image processing device 300 in a temporary or non-temporary manner.

The program of the present invention may be a program which causes a computer to perform each operation explained in each exemplary embodiment described above.

This application claims priority from Japanese Patent Application No. 2011-271531, filed on Dec. 12, 2011, the disclosure of which is incorporated herein in its entirety by reference.

DESCRIPTION OF SYMBOL

1 CPU
2 storage unit
3 storage device
4 communication unit
5 input unit
6 output unit
10 learning image
20 blurred image
30 input image
32 blur parameter
40 restored image
50 patch
51 pixels
52 pixel
100 and 500 learning device
110 reception unit
120 and 510 blurred image generation unit
130 and 520 patch pair generation unit
140 and 530 registration unit
200, 600, and 800 dictionary
201 restoration patch
202 blurred patch
203 patch pair
204 blur parameter
300, 400, and 700 image processing device
310 reception unit
320 and 710 blur estimation unit
330 and 720 patch generation unit
340, 410, and 730 selection unit
350 and 740 combining unit
1000 image processing system
X image
Y patch
Z pixel

The invention claimed is:

1. A dictionary creation device comprising:
a processor configured to:
output a blurred image to a learning image together with a blur parameter indicating a blurring state of the blurred image;
generate a restoration patch and a blurred patch as a patch pair that is composed of the patches located at the corresponding positions of the learning image and the blurred image; and
associate the patch pair with the blur parameter and register the patch pair and the blur parameter in a dictionary.

2. The dictionary creation device according to claim 1 wherein the processor is further configured to generate the blurred image by performing at least one among a size reduction process, a lightness reducing process, a high frequency component eliminating process, and a posture variation process to the learning image and
the blur parameter includes a value indicating at least one among a scaling factor, lightness, a degree of blur, and a posture slope.

3. The dictionary creation device according to claim 1 wherein the processor is further configured to generate the patch pair by using the restoration patch that is generated by shifting the patch by one pixel column in the learning image.

4. An image processing device comprising:
a processor configured to:
estimate a value of a blur parameter indicating a blurring state with respect to an input image that is an image received from outside;
divide the input image and generate a plurality of input patches;
refer to a dictionary storing two or more sets of data in which a blurred patch generated from a learning image, a restoration patch, and the blur parameter of the blurred patch are associated with each other and select the restoration patch for each input patch based on a value indicating a feature similarity and a value indicating a similarity of the blur parameter between the input patch and the blurred patch in the dictionary; and
combine the restoration patches selected for each input patch and generate the restored image.

5. The image processing device according to claim 4 wherein the blur parameter includes values indicating a scaling factor, lightness, a degree of blur, and a posture slope.

6. The image processing device according to claim 5 wherein the processor is further configured to estimate the value of the blur parameter of the input image by
calculating the scaling factor based on an aspect ratio of the input image and an aspect ratio of the learning image,
calculating the lightness based on an average value of brightness values of the input image,
calculating the degree of blur based on a magnitude of a high frequency component of the input image, or
calculating the posture slope by estimating a direction.

7. The image processing device according to claim 5 wherein the processor is further configured to calculate the value indicating the similarity of the blur parameter by using a value weighted by a weighting factor set for each blur parameter.

8. The image processing device according to claim 7 wherein the processor is further configured to set a higher weighting factor for the scaling factor and the lightness than for the degree of blur and the posture slope.

9. The image processing device according to claim 7 wherein the processor is further configured to receive an input of the weighting factor set by a user.

10. The image processing device according to claim 4 wherein the processor is further configured to select the restoration patch in only a range in which it is shown that the blur parameter is similar that is determined by a comparison between a value indicating a similarity of the blur parameter and a predetermined threshold value.

11. An image processing system including a dictionary creation device and an image processing device wherein
the dictionary creation device configured to:
output a blurred image generated by performing a blurring process to a learning image together with a blur parameter indicating a blurring state of the blurred image,
generate a restoration patch and a blurred patch as a patch pair that is composed of the patches located at the corresponding positions of the learning image and the blurred image, and
associate the patch pair with the blur parameter and register the patch pair and the blur parameter in a dictionary and
the image processing device is configured to:
estimate value of a blur parameter indicating the blurring state with respect to an input image that is an image received from outside,
divide the input image and generate a plurality of input patches,
refer to the dictionary created by the dictionary creation device and select the restoration patch for each input patch based on a value indicating a feature similarity and a value indicating a similarity of the blur parameter between the input patch and the blurred patch in the dictionary, and
combine the restoration patches selected for each input patch and generate the restored image.

12. A method for creating a dictionary comprising:
outputting a blurred image generated by performing a blurring process to a learning image together with a blur parameter indicating a blurring state of the blurred image;
generating a restoration patch and a blurred patch as a patch pair that is composed of the patches located at the corresponding positions of the learning image and the blurred image; and
associating the patch pair with the blur parameter and register the patch pair and the blur parameter in a dictionary.

13. A method for processing an image comprising:
estimating a value of a blur parameter indicating a blurring state with respect to an input image that is an image received from outside;
dividing the input image and generating a plurality of input patches;
referring to a dictionary storing two or more sets of data in which a blurred patch that is a patch of a blurred image generated from a learning image, a restoration patch, and the blur each input patch based on a value indicating a feature similarity and a value indicating a similarity of the blur parameter between the input patch and the blurred patch in the dictionary; and
combining the restoration patches selected for each input patch and generating a restored image.

14. A non-transitory computer-readable storage medium storing a program for causing a computer to execute, comprising:

outputting a blurred image generated by performing a blurring process to a learning image together with a blur parameter indicating a blurring state of the blurred image;

generating a restoration patch and a blurred patch as a patch pair that is composed of the patches located at the corresponding positions of the learning image and the blurred image; and associating the patch pair with the blur parameter and register the patch pair and the blur parameter in a dictionary.

15. A non-transitory computer-readable storage medium storing a program for causing a computer to execute, comprising:

estimating a value of a blur parameter indicating a blurring state with respect to an input image that is an image received from outside;

dividing the input image and generating a plurality of input patches;

referring to a dictionary storing two or more sets of data in which a blurred patch that is a patch of a blurred image generated from a learning image, a restoration patch that is a patch of the learning image, and the blur parameter of the blurred patch are associated with each other and selecting the restoration patch for each input patch based on a value indicating a feature similarity and a value indicating a similarity of the blur parameter between the input patch and the blurred patch in the dictionary; and combining the restoration patches selected for each input patch and generating the restored image.

* * * * *